United States Patent [19]

Yamada

[11] Patent Number: 4,947,269
[45] Date of Patent: Aug. 7, 1990

[54] IMAGE REPRODUCTION APPARATUS CAPABLE OF DIVIDING AN IMAGE INTO PARTS FOR REPRODUCTION ON RESPECTIVE SHEETS

[75] Inventor: Masanori Yamada, Kawasaki, Japan

[73] Assignee: Canon Kabushiki Kaisha, Toyko, Japan

[21] Appl. No.: 372,193

[22] Filed: Jun. 26, 1989

Related U.S. Application Data

[63] Continuation of Ser. No. 289,526, Dec. 27, 1988, abandoned, which is a continuation of Ser. No. 31,048, Mar. 27, 1987, abandoned.

[30] Foreign Application Priority Data

Mar. 31, 1986 [JP] Japan .................................. 61-73107
Mar. 31, 1986 [JP] Japan .................................. 61-73108

[51] Int. Cl.$^5$ ............................................. H04M 1/40
[52] U.S. Cl. .................................. 358/448; 358/451; 382/47
[58] Field of Search ........................ 358/77, 448, 451; 382/47, 9

[56] References Cited

U.S. PATENT DOCUMENTS

| | | | |
|---|---|---|---|
| 4,342,052 | 7/1982 | Rackley et al. | 358/280 |
| 4,580,171 | 4/1986 | Arimoto . | |
| 4,631,596 | 12/1986 | Yagischi | 358/257 |
| 4,679,093 | 7/1987 | Yaguchz | 358/287 |
| 4,686,580 | 8/1987 | Kato et al. | 358/287 |
| 4,712,139 | 12/1987 | Kato | 358/257 |

FOREIGN PATENT DOCUMENTS 3216213 11/1982 Fed. Rep. of Germany .
3442793 6/1985 Fed. Rep. of Germany .

*Primary Examiner*—Edward L. Coles, Jr.
*Attorney, Agent, or Firm*—Fitzpatrick, Cella, Harper & Scinto

[57] ABSTRACT

An image reproduction apparatus capable of dividing the image of a designated area into plural areas and reproducing thus divided image on plural recording sheets, thereby allowing one to obtain a large copy when these sheets are pasted together.

30 Claims, 23 Drawing Sheets

FIG. 16A

① | READY TO COPY                                                                       MODE — 123
[SK1] [SK2] [SK3] [SK4] [SK5] [SK6]

② | NON-EDITING!!                    CENTER!!                 ETC
[SK1] [SK2] [SK3] [SK4] [SK5] [SK6]

③ | FRAME?   BLANK?   DIV?   BOOK?   NONE!!   BACK
[SK1] [SK2] [SK3] [SK4] [SK5] [SK6]

④ | (OVERLAP)      X:__      Y:__               BACK
[SK1] [SK2] [SK3] [SK4] [SK5] [SK6]

⑤ | (OVERLAP)      X:10      Y:10      OK      BACK
[SK1] [SK2] [SK3] [SK4] [SK5] [SK6]

⑥ | (ORIGINAL)      WHOLE?      PART?      BACK
[SK1] [SK2] [SK3] [SK4] [SK5] [SK6]

⑦ | X:___ ↔ ___      Y:___ ↔ ___            BACK
[SK1] [SK2] [SK3] [SK4] [SK5] [SK6]

FIG. 16B

⑧ | X : 50 ⟶ 400　　Y : 30 ⟶ 280　　　　OK　　BACK |
　　[SK1]　[SK2]　[SK3]　[SK4]　[SK5]　[SK6]

⑨ | DIVISION-W!!　　　　　　　CENTER!!　　　ETC　▨ |
　　[SK1]　[SK2]　[SK3]　[SK4]　[SK5]　[SK6]

⑩ | DIVISION-P!!　　　　　　　CENTER!!　　　ETC　▨ |
　　[SK1]　[SK2]　[SK3]　[SK4]　[SK5]　[SK6]

⑪ | (OVERLAP)　　　X : 10　　Y : ✴　　　　　BACK |
　　[SK1]　[SK2]　[SK3]　[SK4]　[SK5]　[SK6]

⑫ | (OVERLAP)　　　X : 10　　Y : 20　　OK　　BACK |
　　[SK1]　[SK2]　[SK3]　[SK4]　[SK5]　[SK6]

FIG. 19

① | READY TO COPY                               123                MODE |
   [SK1]  [SK2]  [SK3]  [SK4]  [SK5]  [SK6]

② | NON-EDITING!!              CENTER!!         ETC |
   [SK1]  [SK2]  [SK3]  [SK4]  [SK5]  [SK6]

③ | FRAME?  BLANK?       BOOK?   NONE!!  BACK |
   [SK1]  [SK2]  [SK3]  [SK4]  [SK5]  [SK6]

④ | MANUAL?        AUTO?                 BACK |
   [SK1]  [SK2]  [SK3]  [SK4]  [SK5]  [SK6]

⑤ | 2A0?   A0?    A1?    A2?    ETC    BACK |
   [SK1]  [SK2]  [SK3]  [SK4]  [SK5]  [SK6]

⑥ | B0?    B1?    B2?    B3?    ETC    BACK |
   [SK1]  [SK2]  [SK3]  [SK4]  [SK5]  [SK6]

⑦ | AUTO-FRAME B0!!            CENTER!!    ETC |
   [SK1]  [SK2]  [SK3]  [SK4]  [SK5]  [SK6]

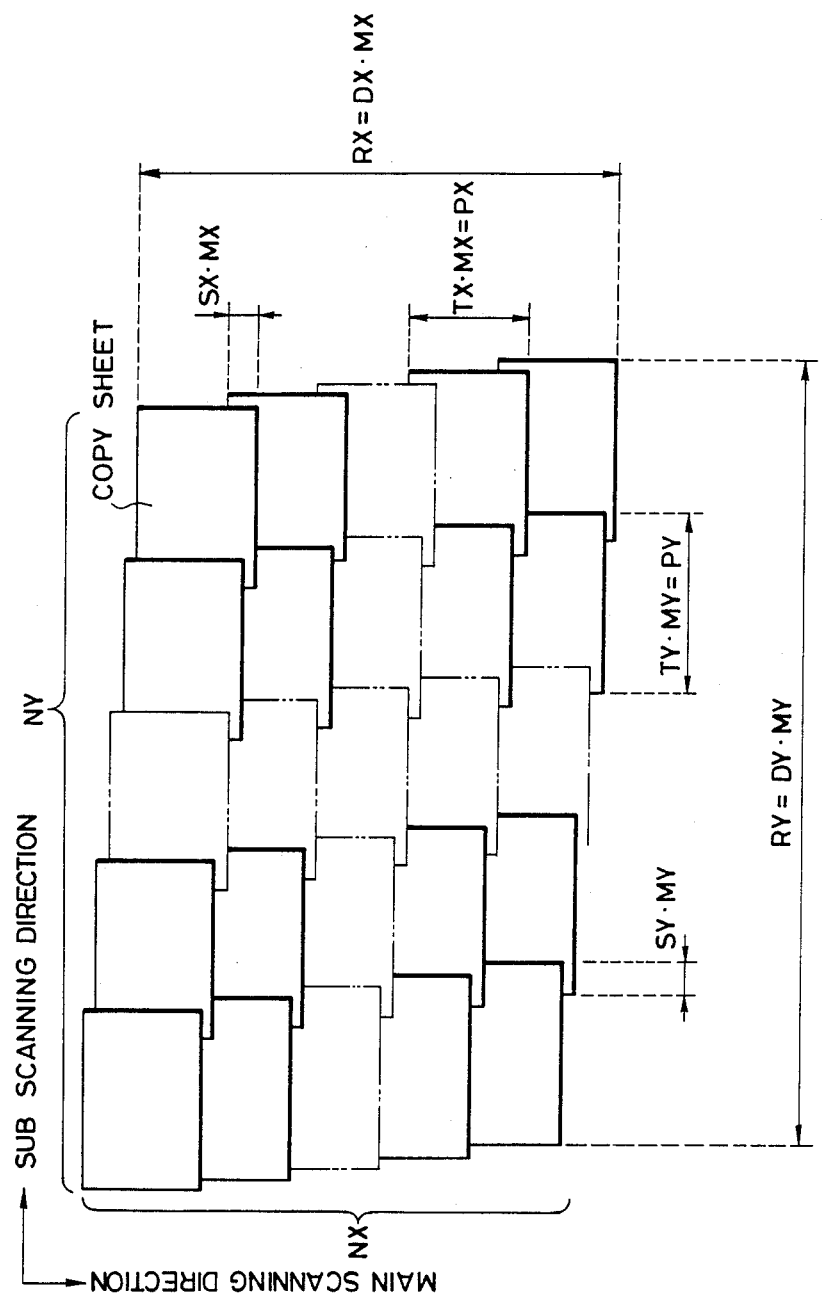

IMAGE REPRODUCTION APPARATUS CAPABLE OF DIVIDING AN IMAGE INTO PARTS FOR REPRODUCTION ON RESPECTIVE SHEETS

This application is a continuation-in-part continuation of application Ser. No. 289,526, filed Dec. 27, 1988, which was a continuation of application Ser. No. 031,048, filed Mar. 27, 1987, now abandoned.

BACKGROUND OF THE INVENTION

1. Field of the Invention

The present invention relates to an image reproduction for producing an image on a recording material, such as a copying machine, a facsimile or the like.

2. Related Background Art

Conventional copying machine are often unable to reproduce the entire image of an original document in the enlarged copying mode due to the limitation imposed by the size of the recording sheet, which is usually A3 size at maximum. In order to obtain a copy of a size exceeding the maximum sheet size by pasting plural copy sheets together, the operator has to change the direction and position of the original document for each copying (the term "pasting is used throughout this specification and the claims, is a convenient generic term for suitable known methods of joining such sheets together). Also such pasting is cumbersome because the order of copies and the pasting margins thereof are not fixed.

Therefore, there has already been proposed, in commonly-assigned the U.S. Pat. application Ser. No. 889,922, an apparatus capable of dividing an original image and recording the thus divided images respectively on different plural sheets after enlargement. Thus, the entire original image can be recorded in an enlarged size exceeding the size of the recording sheet, by pasting together the sheets on which divided images are respectively recorded.

However, it is desirable that such process should be applicable not only to the entire original image but also to a desired partial area thereof. Also the pasting operation becomes tedious if the original image is divided into an excessively large number of areas. In addition the apparatus will be more convenient for use if the division and enlargement of the image is conducted according to the output image size desired by the operator. Furthermore the divided output images require margins for the pasting operation.

SUMMARY OF THE INVENTION

In consideration of the foregoing, an object of the present invention is to enable reproduction of an original image in a size larger than that of the available recording material.

Another object of the present invention is to provide an image reproduction apparatus capable of dividing an arbitrary area of an original image and reproducing the thus divided images respectively on different recording materials.

Still another object of the present invention is to provide an image reproduction apparatus capable of automatically determining the image magnification, optimum sheet size and number of divisions according to the output image size desired by the operator and reproducing the images of desired sizes on plural recording materials.

Still another object of the present invention is to provide an image reproduction apparatus capable, in dividing an original image into plural areas and reproducing thus divided plural image areas respectively on different recording materials, of reproducing the original image in the center of an image frame constituted by plural recording materials.

Still another object of the present invention is to provide an image reproduction apparatus capable, in dividing an original image into plural areas and reproducing thus divided plural image areas respectively on different recording materials, of dividing the original image in such a manner that neighboring image areas mutually overlap with an arbitrary amount of overlap.

The foregoing objects and still other objects of the present invention, and the features and advantages thereof, will become fully apparent from the following detailed description of the preferred embodiments, taken in conjunction with the accompanying drawings.

BRIEF DESCRIPTION OF THE DRAWINGS

FIG. 1-2 is a schematic cross-sectional view of the reader unit and the printer unit; unit;

FIG. 2 is a detailed plan view of an operation

FIGS. 13, 15A, 15B, 15C and 22 are views showing the modes of divided image output;

FIGS. 16A, 16B and 19 are views showing copy mode setting operations;

DETAILED DESCRIPTION OF THE PREFERRED EMBODIMENTS

Now the present invention will be clarified by explanation of the preferred embodiments, shown in the attached drawings.

Figure 1:
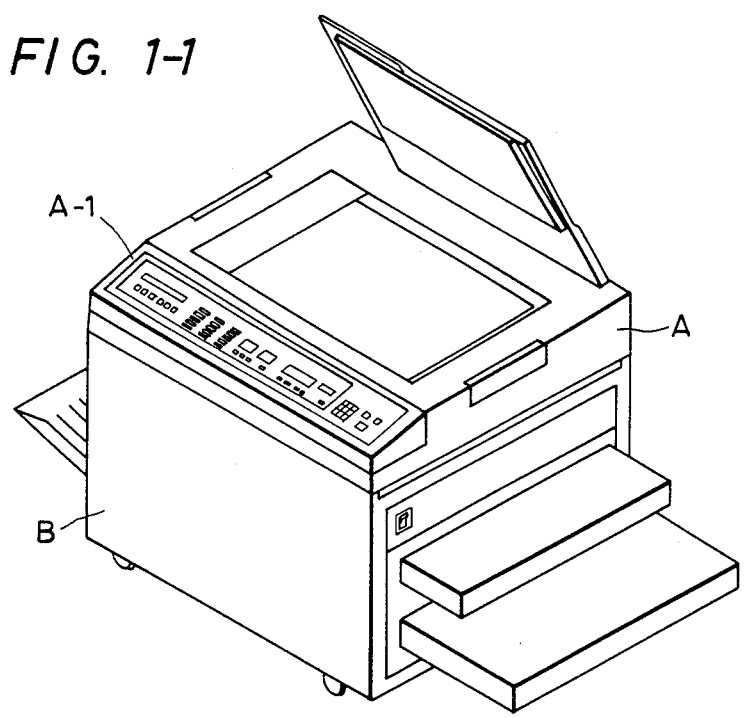
FIG. 1—1 is an external view of a reader unit A and a printer unit B.
Figures 1, 2:
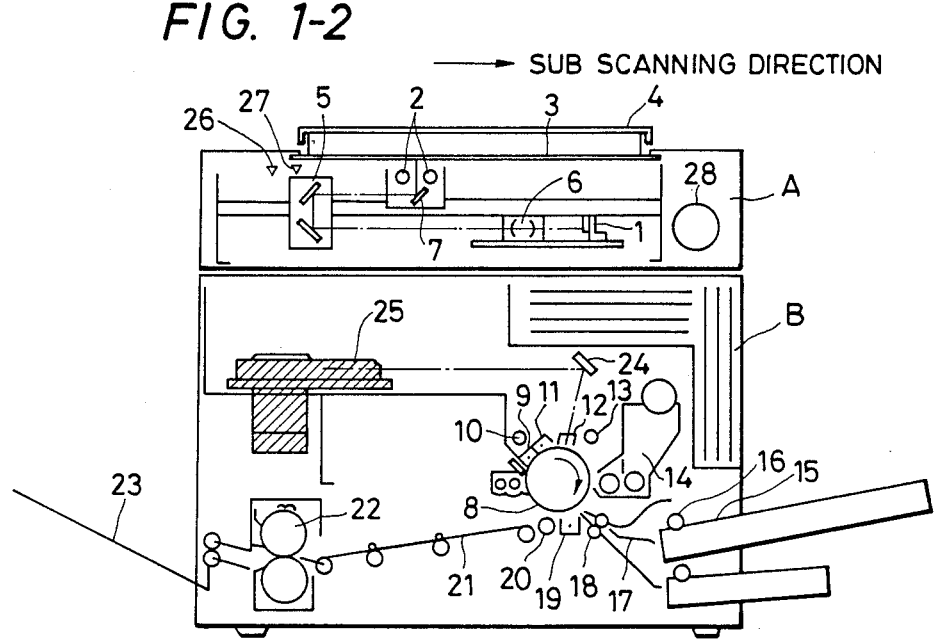
Figure 2:
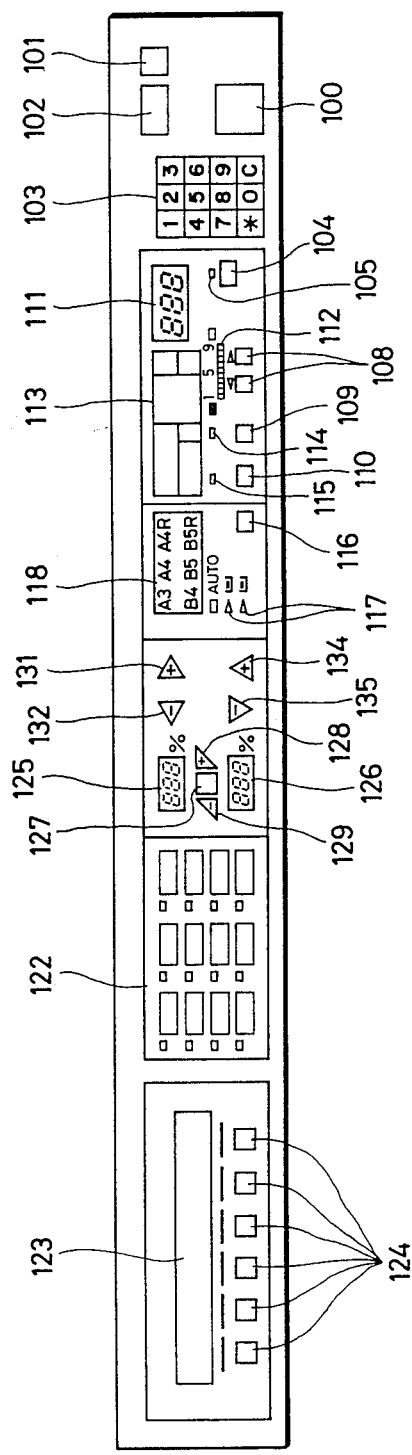

FIG. 1—1 is an external view of a copying apparatus embodying the present invention and composed of a reader unit A for reading an original image and a printer unit B for reproducing the image on a recording material. The reader A is provided with an operation unit A-1. FIG. 1-2 is a cross-sectional view of the reader A and the printer B. The original document is placed, with its face down, on an original support glass 3, and is pressed thereon by an original cover 4. Said original is illuminated by a fluorescent lamp 2, and the light reflected from the original is focused on a CCD 1 through mirrors 5, 7 and a lens 6.

The mirror 7 and the mirror 5 move with a relative speed ratio of 2 : 1. This optical system is reciprocated at a constant speed by a DC servo motor 28 under phase locked loop control. In the same-size copying mode, the forward motion from left to right is conducted at a speed of 180 mm/sec, and the reverse motion from right to left is conducted at a speed of 800 mm/sec regardless of the image magnification. The maximum readable original size is A3, and the resolving power is 400 dots-/inch. Consequently the CCD 1 is required to have:

$$4678 (=297/25.4 \times 400) \text{ bits.}$$

Consequently the reader A employs a CCD of 5,000 bits. Also the period of main scanning is:

$$352.7 \ \mu\text{sec} \ (=10^6/180 \times 25.4/400).$$

The original image is linearly scanned by said CCD 1 to obtain an image signal representing the image density.

Sensors 26, 27 are provided for detecting the position of the optical system. The sensor 26 detects that the optical system is at a home position, while the sensor 27 detects that the optical system has reached a front end position of the original support glass.

The serial image signal obtained in the reader A is supplied to a laser scanning optical unit 25 of the printer B. Said unit 25 is composed of a semi-conductor laser, a collimating lens, a rotary polygon mirror, an F-$\theta$ lens and an image inclination correcting optical system.

The image signal from the reader A is converted, in the semi-conductor laser, into a light beam, which is introduced through the collimating lens to the polygon mirror rotating at a high speed to scan a photosensitive member 8 through a mirror 24. Around said photosensitive member there are provided imaging process components, including a charge eliminator 9, a pre-exposure lamp 10, a primary charger 11, a secondary charger 12, a flush exposure lamp 13, and a developing unit 14. Also there are provided sheet cassettes 15, sheet feeding rollers 16, sheet guide members 17, registration rollers 18, a transfer charger 19, a separating roller 20, a conveyor guide 21, a fixing unit 22 and a tray 23 to transfer the image, formed on the photosensitive member 8, onto a recording sheet. The peripheral speed of the photosensitive member 8 and the speed of sheet transport are 180 mm/sec. Thus the printer B constitutes a so-called laser beam printer. At a lateral end of the photosensitive member 8 there is provided an unrepresented sensor for detecting the laser beam and generating a beam detection signal BD indicating the start of each scanning motion with the laser beam.

The copying apparatus of the present embodiment has certain intelligent functions, including arbitrary variation of image magnification at a pitch of 1 % from 0.35 times to 4.0 times, image trimming for extracting a designated area of the image, image displacement for moving the thus extracted image to an arbitrary position on the sheet, and detection of the coordinates of the original image placed on the original support glass 3, as will be further explained in the following.

FIG. 2 is a detailed plan view of the operation unit A-1.

There are provided a copy start key 100; a copy stop key 102; a reset key 101 for resetting the copying mode to a standard state; numeral keys 103 including a clear key C for clearing the entry with the numeral keys and an asterisk key * employed for entering numeral data such as those indicating a trimmed area; density up-down keys 108; a display unit 112 for indicating the image density; a key 104 for turning on or off the detection of the coordinates of the original; a corresponding display 105; a copy number display unit 111; an error display unit 113; a key 109 for turning on or off the automatic density control function; a corresponding display unit 114; a key 110 for turning on or off a dither process function for a photograph original; a corresponding display unit 115; a key 116 for selecting the sheet cassettes and selecting an automatic sheet selecting function; a display unit 117 for displaying the selected sheet cassette; a display unit 118 for displaying the sheet size; a preset key display unit 122 for presetting the copying mode and recalling thus preset mode; a liquid crystal display unit 123 composed of 32 digits of $5 \times 7$ display matrix; and software keys 124 for selecting one of the copy modes displayed on the display unit 123.

There are further provided a display unit 125 for displaying the image magnification MY in the sub-scanning direction in %, a display unit 126 for displaying the image magnification MX in the main scanning direction in %; a key 127 for alternately selecting the same size mode in which the image magnifications MX, MY respectively in the main and sub scanning directions are both 100 % and an automatic image size varying mode (MX=MY); keys 128, 129 for respectively increasing and decreasing MX and MY at the same time by 1 % at a time; keys 131, 132 for respectively increasing and decreasing MX only by 1% at a time; and keys 134, 135 for respectively increasing and decreasing MY only by 1 % at a time.

Figure 3:
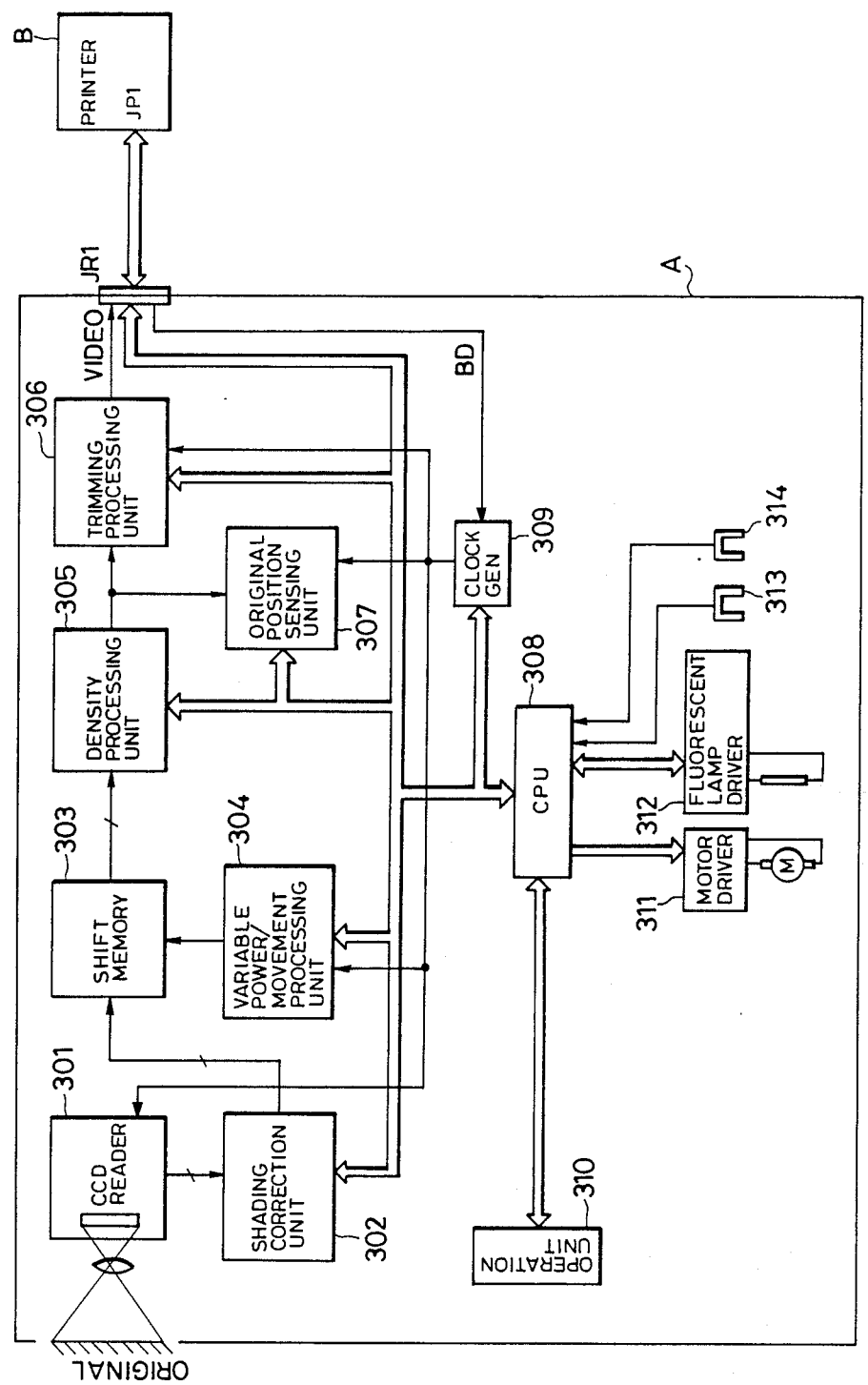
FIG. 3 is a block diagram of the reader unit.

FIG. 3 is a block diagram of the reader B.

A CCD reader 301 is provided therein with a CCD, a clock driver therefor, an amplifier for the signal from the CCD, an A/D converter for converting said signal into a digital signal, etc. Thus the CCD reader 301 releases image data converted into digital signals of 6 bits (64 levels), which are supplied to a shading correction unit 302.

After detection of shading in the light source and lens and correction therefor in the shading correction unit 302, the image data are temporarily stored in a shift memory unit 303, provided with shift memories of two lines, of which one is used for storing image data of N—th line while the other is used for releasing the image data of (N−1)—th line. The shift memory unit 303 is further provided with a write address counter for image data storage in the shift memories, a read address counter for reading image data from the shift memories, and an address selector circuit for selecting the address signals from said counters, as will be more detailedly shown in FIG. 5.

A variable size/movement unit 304 varies the image size and moves the image in the main scanning direction by controlling the clock signals for image data writing or reading and the timing of image data reading, as will be more detailedly explained later.

The image signals released from the shift memory unit 303 are supplied to a density processing unit 305 for binarizing process or dither process, and the obtained binary signals are supplied to a trimming process unit 306, which converts an arbitrary section of the image data of the main scanning line to "0" or "1", thereby enabling image editing, as will be later explained more detailedly. The binary signals from the density processing unit 305 are also supplied to an original position detecting unit 307, for detecting the position of the original on the original support glass 3 by means of said binary signals and detecting means to be explained later.

A CPU unit 308 is composed of an already known microcomputer, provided with a CPU, a ROM, a RAM, a timer circuit and an I/0 interface. The CPU unit 308 controls the reader A in response to the instructions from the operator through an operation unit 310 and also controls the printer B through serial communication. A motor driver 311 controls the speed of the DC servo motor according to the image magnification set by the CPU unit 308. A lamp driver 312 turns on and off the fluorescent lamp 2 and also controls the intensity thereof. Sensors 313, 314, for sensing the position of the optical system, correspond to the sensors 26, 27 shown in FIG. 1-2.

The reader A and the printer B are mutually connected through a connector JR1 of the reader A and a connector JP1 of the printer B, for exchanging control signals required for image data communication and for serial communication, as will be explained later in relation to FIGS. 10 and 11. From the printer B the horizontal synchronization signal BD synchronized with the image recording of each line is released through the connector JR1, and is supplied to a clock generator 309, which generates transfer clock signals for the CCD signals and read/write clock signals for the shift memories in synchronization with said synchronization signal BD. The printer B also supplies the reader A with a size signal, indicating the sheet size available on the printer, through the connectors JP1, JR1.

Figure 4:
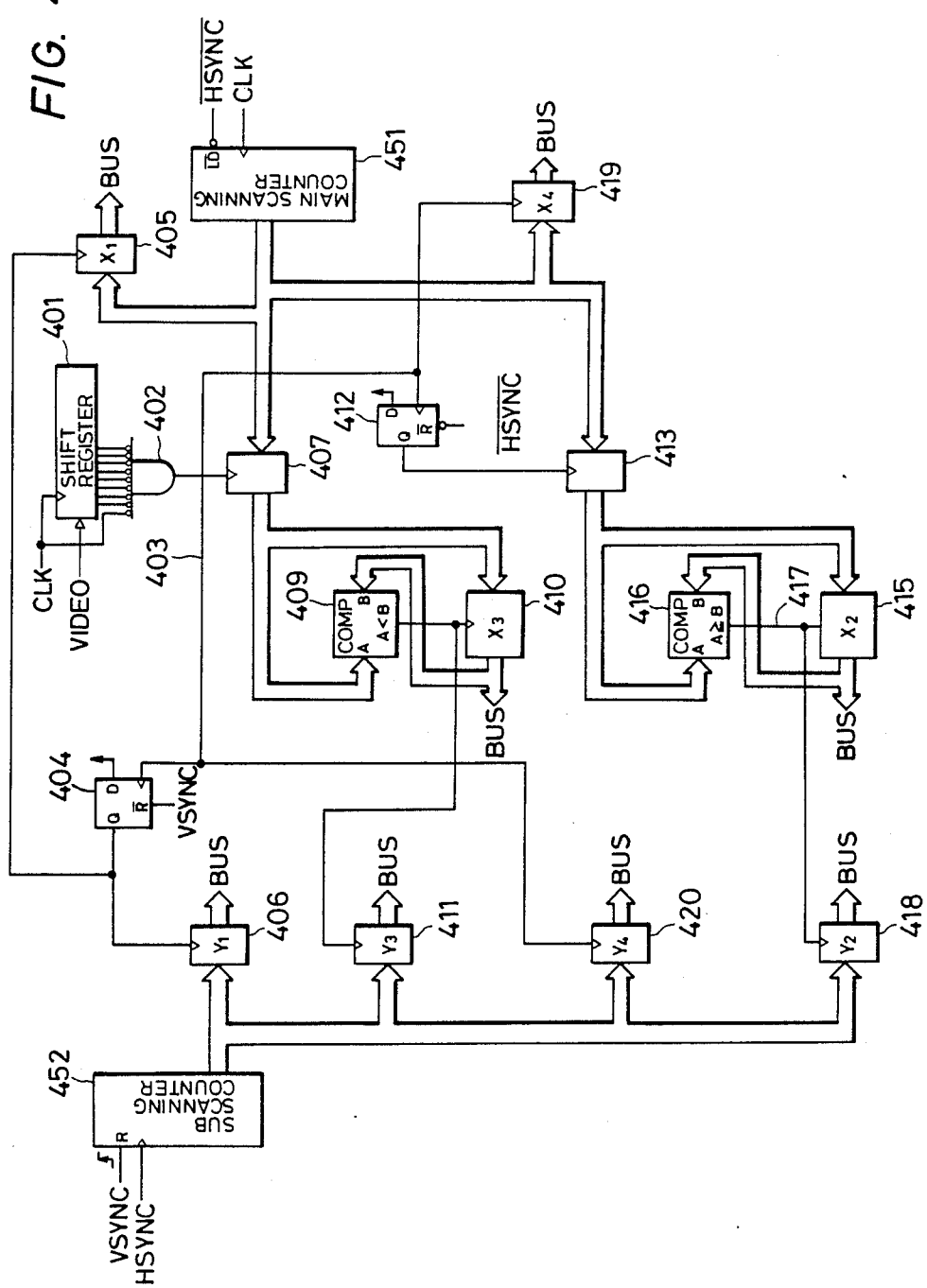
FIG. 4 is a block diagram of a circuit for detecting the coordinates of the original document.

FIG. 4 is a block diagram of the original position sensing unit 307 for detecting the coordinate of the original.

A main scan counter 451, consisting of a down counter, indicates the scanning position in a main scanning line. Said counter 451 is set to the maximum value in the main scanning direction X in synchronization with the horizontal synchronization signal SHYNC for each line, and performs stepwise decrement for each image data clock signal CLK. A sub scanning counter 452, consisting of an up counter, is reset to "0" at the upshift of an image front end signal VSYNC, and performs stepwise increment in response to the signal HSYNC, thus representing the scanning position in the sub scanning direction.

Prior to the original image reading, the CCD 1 performs a pre-scanning for detecting the coordinate of the original image, and the binary image data VIDEO obtained by said pre-scanning are supplied to a shift register 401 in a unit of 8 bits. In response to the entry of 8 bits, a gate circuit 402 identifies whether said 8 bits are all white "0", and, if so, releases a signal "1" to a signal line 403. In response to the appearance of first eight consecutive white bits after the start of original scanning, there is set a flip-flop 404 which is reset in advance by the signal VSYNC synchronized with the start of reading of an image frame and which remains set, after once being set, until the succeeding VSYNC signal. When said flip-flop 404 is set, a latch 405 latches the value of the main scanning counter 451 at this point, representing a coordinate X1. Also a latch 406 latches the value of the sub scanning counter 452 at this point, representing a coordinate Y1. In this manner a coordinate (X1, Y1) is determined.

Also at each supply of the signal "1" to the signal line 403, the value of the main scanning counter 451 is loaded in a latch 407. At the appearance of the first consecutive eight white bits, the value of the main scanning counter loaded in the latch 407 is compared, in a comparator 409, with the value of a latch 410 which is set at the maximum value in the X-direction in synchronization with the VSYNC signal. If the value of the latch 407 is smaller, said value is loaded in the latch 410. At the same time the value of the sub-scanning counter 452 is loaded in a latch 411. The above-explained procedure is completed prior to the entry of the succeeding eight bits into the shift register 401. In this manner the comparison of the values of the latches 407, 410 is conducted over the entire image area, whereupon the latch 410 retains the minimum value in the X-direction of the original image, while the latch 411 retains the corresponding coordinate in the Y-direction. Since the main scanning counter 451 is composed of a down counter, the coordinate corresponding to the minimum value in the X-direction represents a point (X3, Y3) farthest from the starting point of scanning.

A flip-flop 412 is reset by the horizontal synchronization signal HSYNC, then set by the first consecutive white bits in the main scanning direction and remains set until the succeeding SHYNC signal. When said flip-flop 412 is set, the value of the main scanning counter corresponding to the position of the first white signal in a line is loaded in a latch 413, and is compared, in a comparator 416, with the value of a latch 415 which latches the minimum value "0" in the X-direction at the start of the VSYNC signal. If the value of the latch 415 is smaller than or equal to that of the latch 413, a signal 417 is activated to load the value of said latch 413 into the latch 415. The above-explained procedure is conducted between two neighboring signals HSYNC. The above-explained comparison is repeated over the entire image area whereupon the latch 415 retains the maximum coordinate of the original in the X-direction, i.e., the X-coordinate X2 of a white signal closest to the scanning start position in the main scanning direction. Also when the signal line 417 is activated, the value of the sub-scanning counter 452 is loaded in a latch 418 as Y2. In this manner the coordinate (X2, Y2) is determined.

At each appearance of consecutive eight white bits over the entire image area, the values of the main scanning counter 451 and of the sub scanning counter 452 are loaded respectively in latches 419, 420, in response to a signal 403. Consequently, at the end of the pre-scanning of the original image, the latches 419, 420 retain the counts (X4, Y4) at the appearance of last consecutive eight white bits.

The data lines of the above-mentioned eight latches 405, 406, 415, 416, 410, 411, 419, 420 are connected to a bus line BUS of the CPU 308 shown in FIG. 3, and the data of said latches are read by the CPU 308 at the end of the pre-scanning operation.

In this manner there are obtained the coordinates P1–P4 of four corners of the original document placed on the original support glass. From these coordinates there are determined the lengths DX, DY in the main scanning and sub scanning directions of the original document.

Figure 5:
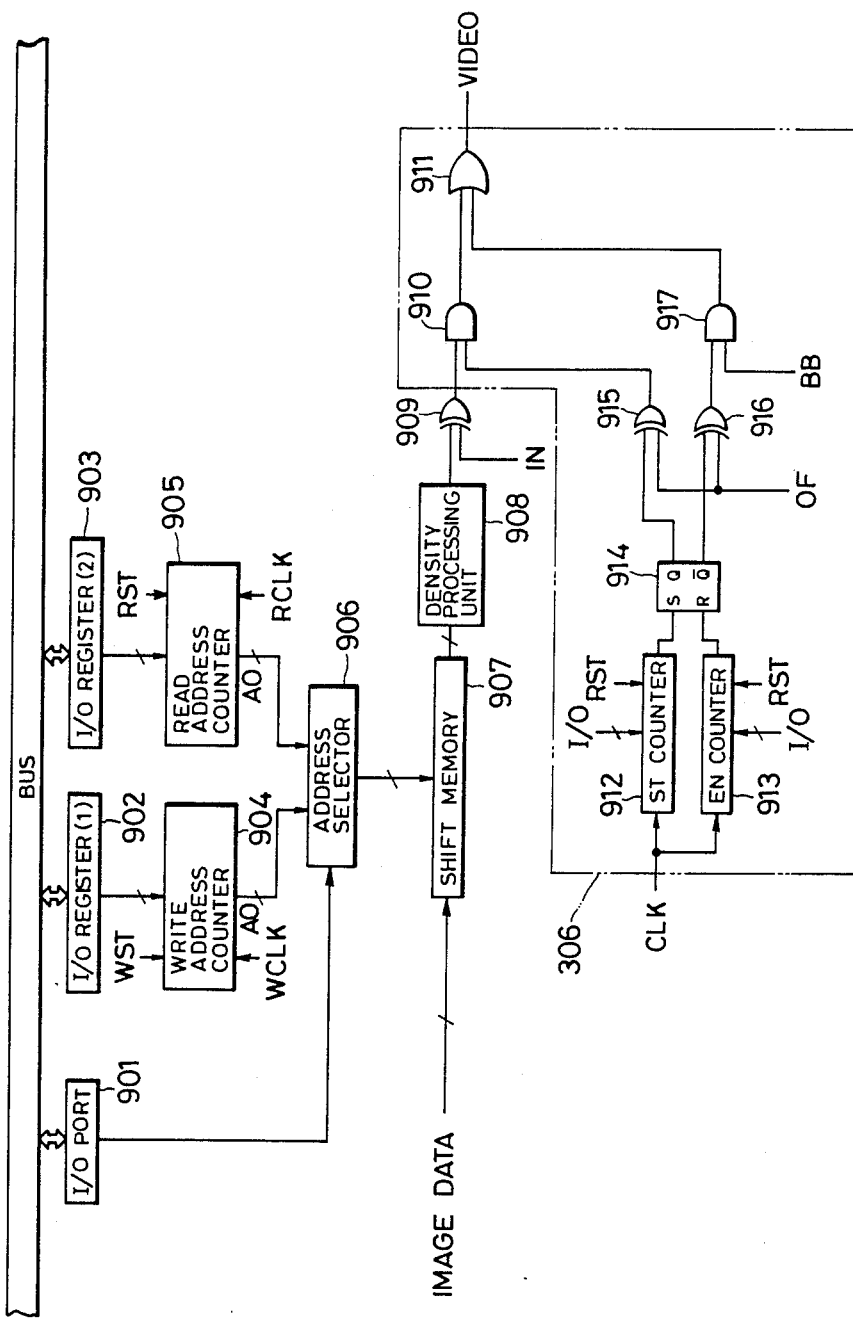
FIG. 5 is a block diagram for image editing, image displacement and variation of image magnification.

FIG. 5 is a circuit diagram of the shift memory unit 303. Though the shift memory unit 303 has two shift memories as explained before, FIG. 5 shows only one shift memory since the control is same for both memories. There are provided a write address counter 904 for determining the address for data storage in a shift memory 907; a read address counter 905 for determining the address for data reading from the shift memory 907; an address selector 906 for selecting the address signal from the write address counter 904 or that from the read address counter 905 in response to a command from the CPU 308 received through an I/0 port 901; and I/0 registers 902, 903 for supplying preset values from the CPU 308 to the write address counter 904 and the read address counter 905.

Said write address counter 904 and said read address counter 905, both composed of down counters, respectively receive signals WST and RST for starting the counting operation, and also a write clock signal WCLK for data writing into the shift memory 907 and a read clock signal RCLK for data reading from the shift memory 907.

A trimming process unit 306, corresponding to that shown in FIG. 3, is provided with exclusive OR gates 915, 916, which are controlled by a signal OF. When said signal is "1", the inside of a frame defined by a start counter 912 and an end counter 913 while the outside of said frame is released as the output image, and vice versa in case said signal is "0".

An AND gate 910 controls the output of image data released from the shift memory 907 and binarized in a density process unit 908. An AND gate 917 released said masked area as black or white respectively when a control signal BB is "1" or "0".

An OR gate 911 releases the image data from the gates 910, 917, as the VIDEO signal. An exclusive OR gate 909 for controlling the inversion of the image data releases the original image data or inverted image data respectively when a control signal IN is "1" or "0". The above-mentioned signals are released by the CPU 308 according to the mode designated by the operator.

In the start counter 912 and the end counter 913 for defining the image output area, count data for gating are preset by the CPU 308 through I/0 port.

Figure 6:
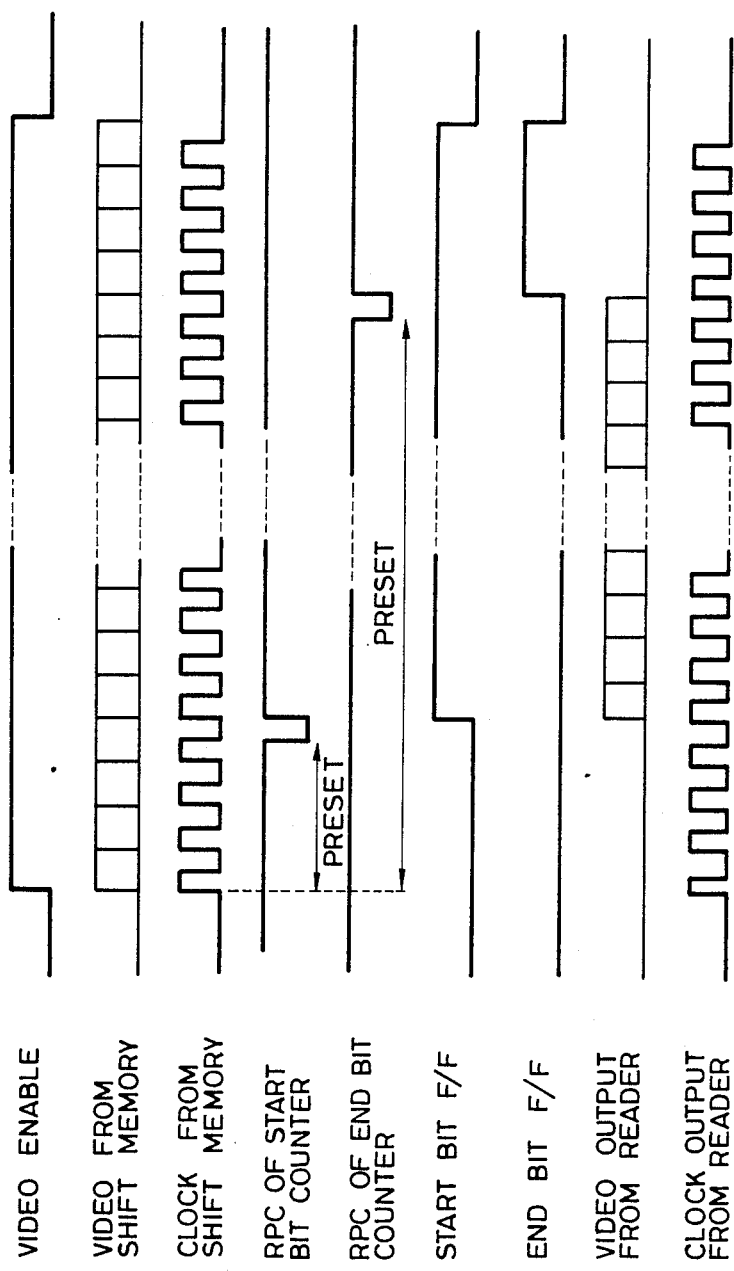
FIG. 6 is a timing chart of an image trimming operation.

A flip-flop 914 is set in response to the completion of counting operation of the start counter 912 and is reset in response to the completion of counting operation of the end counter 913, as shown in FIG. 6.

For example, in case the signal OF is "1", the signal Q of the flip-flop 914 is shifted to "1" at the completion of the counting operation of the start counter 912 to shift the output of the gate to "0", whereby the gate 910 does not release output signal until the completion of the counting operation of the end counter 913, thereby achieving a masking operation. Instead the gate 916 releases a signal "1" to release a signal "1" from the gate 917 if the signal BB is "1", whereby the gate 911 releases a signal "1" to provide a black mask. On the other hand, a white mask is obtained in case OF="1" and BB="0". On the other hand, in case OF="0", the gates 915, 916 respectively release signals "1" and "0" so that the outside of the trimming area becomes black or white respectively when BB="1" or "0".

In the following there will be explained the principle of varying image size.

The image size variation in the sub scanning direction is achieved by varying the scanning speed of the optical system. Based on the image magnification designated by the operator, the CPU 308 calculates the speed of the DC servo motor 28, then determines the frequency of phase locked loop control corresponding to said speed, and presets said frequency in the motor driver 311 shown in FIG. 3 prior to the scanning operation. Since the sheet transport speed in the printer B is always 180 mm/sec, a size enlargement to 2 times or a size reduction to ½ times is achieved by moving the optical system with a half speed 90 mm/sec or a doubled speed 360 mm/sec.

FIG. 7 shows the principle of image size variation in the main scanning direction.

The serial signal of a constant frequency released by the CCD 1 and subjected to A/D conversion is sampled at a clock rate corresponding to the image magnification. In the case of a same-size copying mode, the data are written into the shift memory 907 with a write clock WCLK of a rate same as that of the transfer clock signal CLK for signal transfer from the CCD as shown in FIG. 7A, and are read from the shift memory according to a read clock signal RCLK of a rate same as that of the output clock signal VLCK for signal transfer to the printer B as shown in FIG. 7B.

Figure 7A:
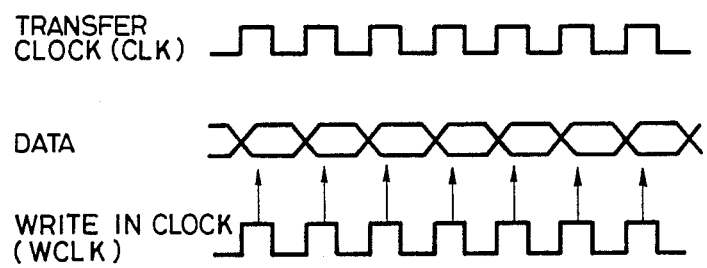
FIG. 7 consisting of FIGS. 7A-7D, is a schematic view showing the principle of varying the image magnification.
Figure 7B:
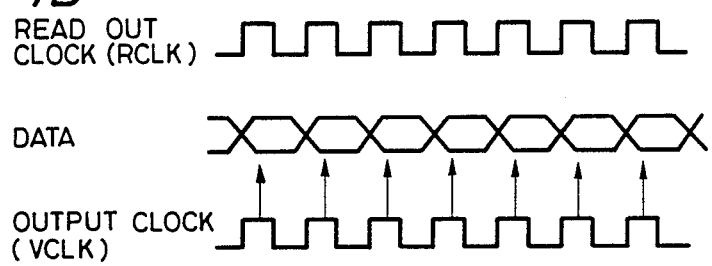
Figure 7C:
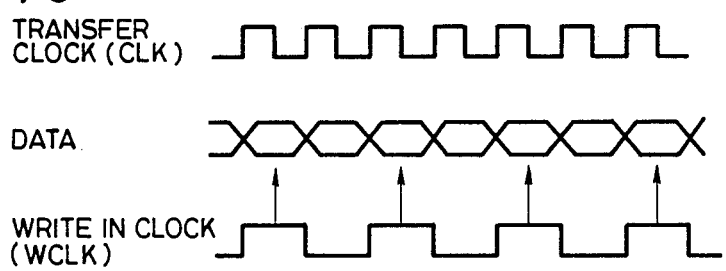

As an example, in case of image size reduction to half, the write clock signal WCLK for signal writing into the shift memory has a frequency which is a half of that of the transfer clock signal CLK as shown in FIG. 7C, whereby the original data are sampled at every other bit, while the data reading is conducted with the reading clock signal RCLK of a rate equal to that of the output clock signal VLCK as shown in FIG. 7B.

Figure 7D:
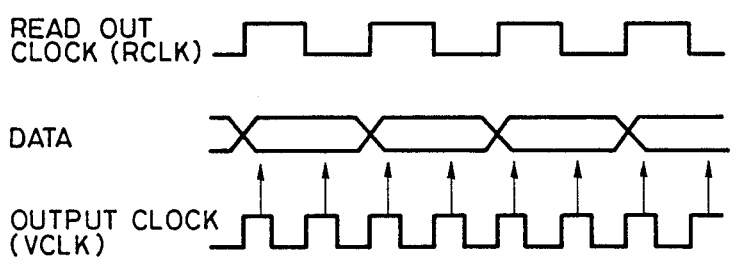

In case of image size enlargement of 2 times, the data writing into the shift memory 907 is conducted in the same manner as shown in FIG. 7A while the data reading from the shift memory 907 is conducted with the read clock signal RCLK of a clock rate equal to one half of that of the output clock signal VLCK as shown in FIG. 7D, whereby each of the original data is amplified to two bits, thereby achieving an image enlargement of two times.

Figure 8:
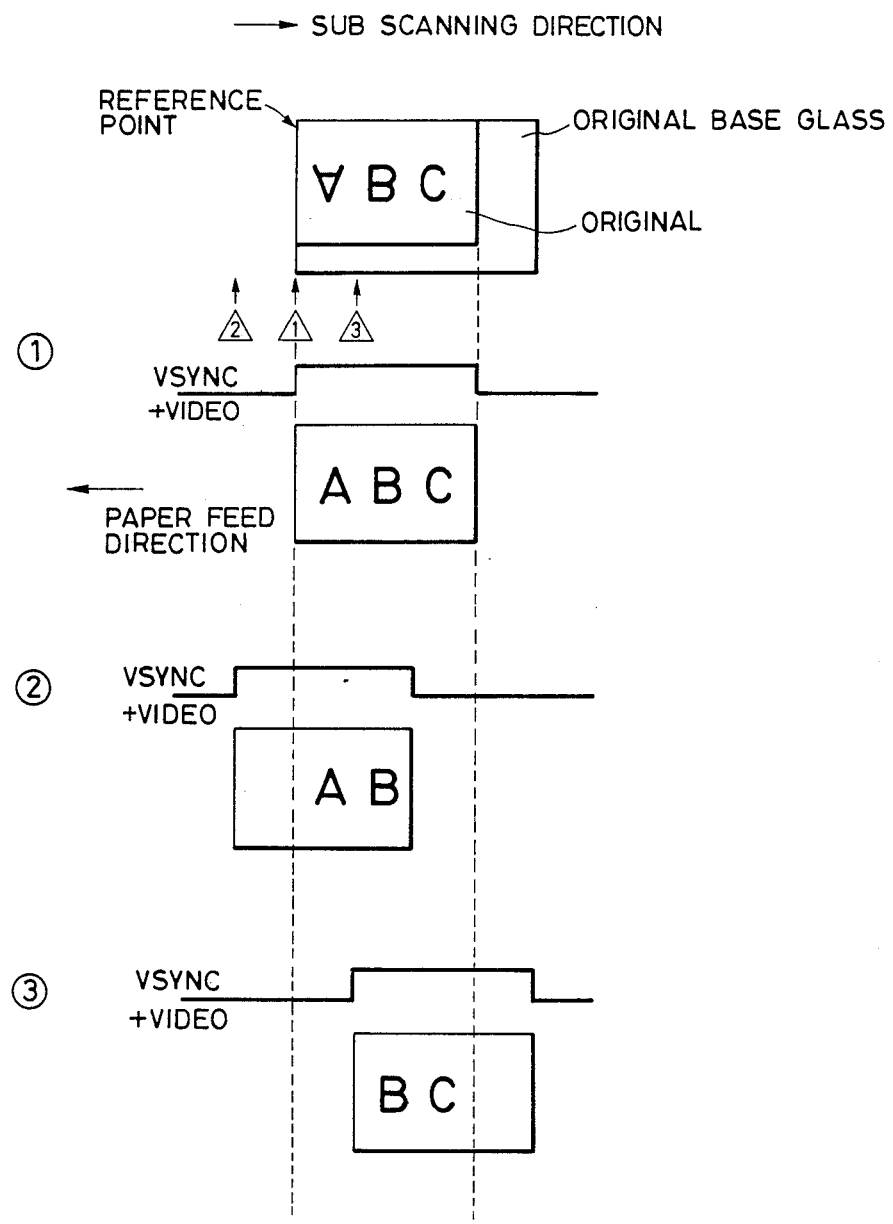
FIGS. 8 and 9 are schematic views showing the principle of image displacement.
Figure 9:
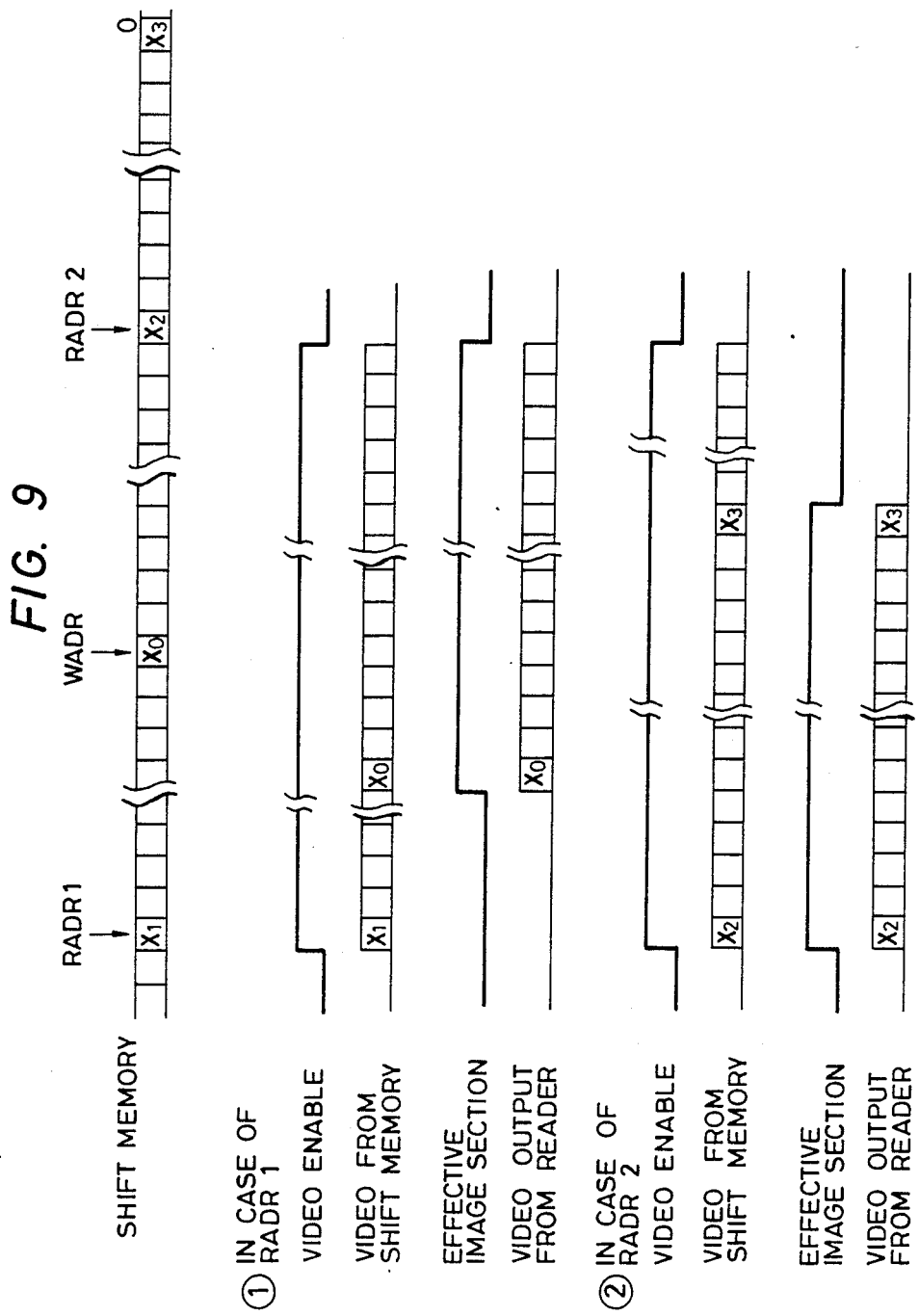

Now reference is made to FIGS. 8 and 9 for explaining the principle of image movement.

In the sub-scanning direction, the image movement in the sub-scanning direction is achieved, as shown in FIG. 8, by controlling the timing of original scanning and the timing of supply of the VSYNC signal to the printer B, as shown in FIG. 8.

In the image reading, if the VIDEO signal is released with the VSYNC signal when the optical system reaches a position 1 with respect to the original, there is obtained an unmoved output signal as shown by (1). On the other hand, if the VIDEO signal is released with the VSYNC signal when the optical system reaches a position 2, the image is moved to the rear side of the recording sheet. Also if the VIDEO signal is released with the VSYNC signal when the optical system reaches a position 3, the image is moved to the front side of the sheet.

The image movement in the main scanning direction is achieved, as shown in FIG. 9, by a change in the down-count start address to be given to the write address counter 904 and the read address counter 905 through the I/0 registers 902, 903 shown in FIG. 5.

For example, by displacing the reading start address to RADR1 with respect to the writing start address WADR into the shift memory 907, the image data X0 is moved to right with respect to the main output scanning width VIDEO ENABLE as shown in (1). Also by moving the reading start address to RADR2, the data X3 corresponding to the address 0 of the shift memory is moved to left with respect to the VIDEO ENABLE signal as shown in (2). The effective image area signal VIDEO ENABLE shown in FIG. 9 determines the trimming area in the main scanning direction, defined by the start counter 912, end counter 913, flip-flop 14, gates 915, 916, 917, 910, 911 shown in FIG. 5 and is used for providing white signals except for a section between the addresses 0 and WADR in the shift memory 907 shown in FIG. 9.

Figure 10:
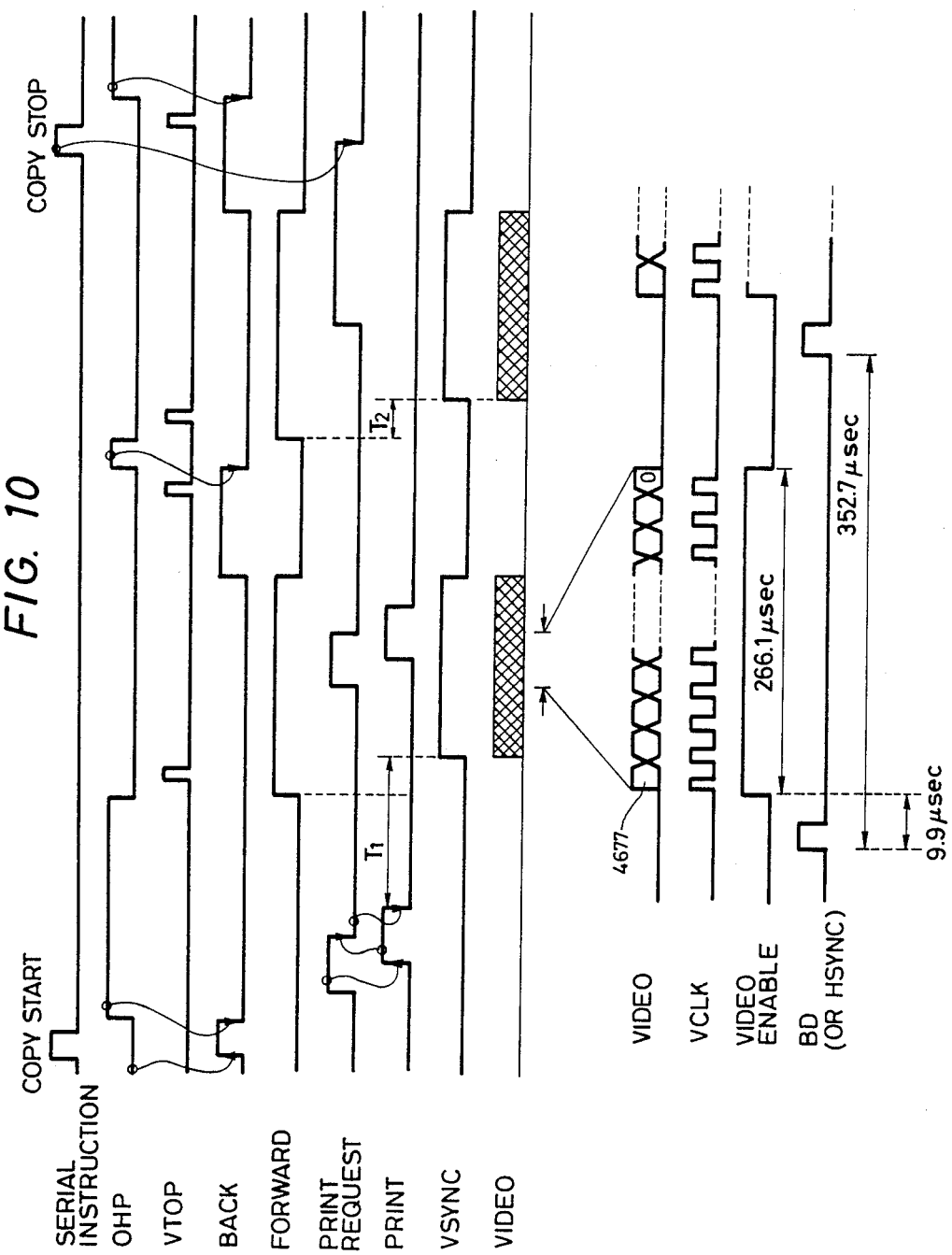
FIGS. 10 and 11 are timing charts of an interface with the printer unit.
Figure 11:
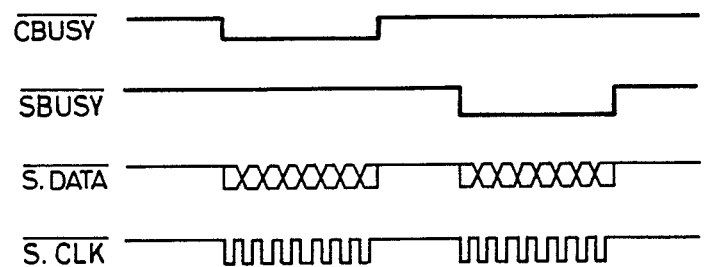

Now reference is made to FIGS. 10 and 11 for explaining the timing of the interface signals to be exchanged between the reader A and the printer B.

The beam detection signal BD is a front end signal in each main scanning line and is used for synchronizing the rotation of the polygon mirror of the printer B with the scanning operation or the image data of the reader A when it is connected with the printer B. The image data VIDEO consist of 4678 pulses of a duration of about 56 μsec each in each scanning line, and are synchronized with the beam detection signal BD when connected to the printer B, or with an internal pseud horizontal synchronization signal (hereinafter called HSYNC) in case of transmission to another unit. The section signal VIDEO ENABLE corresponds to the duration of 4678 pulses of said image data, and is synchronized with the signal BD or HSYNC.

A section signal VSYNC indicates the image area in the sub-scanning direction.

A signal PRINT REQUEST indicates a sheet feeding enabled state in the printer B. In response to this signal, the reader A instructs sheet feeding by a PRINT signal, and then releases the image data VIDEO together with the VSYNC signal after a time T1 determined in consideration of the image magnification, trimming area and amount of image movement corresponding to the copying mode designated by the operator.

Input signals OHP, VTOP are entered by the sensors 313, 314 indicating the optical system as shown in FIG. 3. Signals BACK, FORWARD are supplied from the CPU 308, shown in FIG. 3, to the motor driver 311 for respectively driving the motor in the backward or forward direction.

FIG. 11 shows signals S.DATA, S.CLK, CBUSY and SBUSY for communication between the reader A and the printer B. The signals S.DATA and S.CLK are bi-directional serial data and clock signals of 8 bits. The signal CBUSY is released when the reader A releases the data and clock signals, and the signal SBUSY is released when the printer B releases the data and clock signals.

FIG. 10 is a timing chart showing examples of serial communication, such as a copy start command or a copy stop command from the reader A to the printer B.

In the following there will be explained a divided copying mode, while making reference to FIGS. 12 to 15.

Figure 12A:
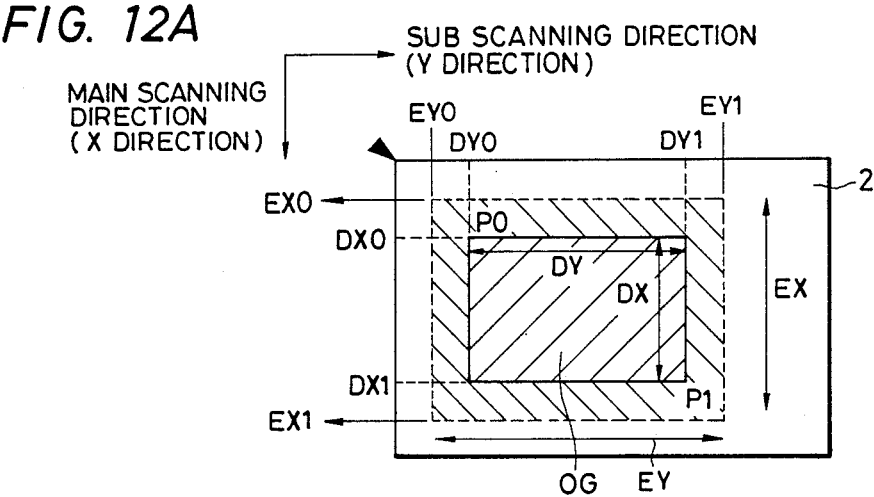
FIG. 12A and 12B are schematic views showing the function in a divided copying mode.

FIG. 12A shows an original or designated area OG defined by DX0, DX1, DY0 and DY1.

FIG. 12 B shows an example of image output with plural sheets, in case said area OG, multiplied by an image magnification selected in the operation unit, cannot be accommodated in the main scanning and/or sub-scanning direction of a sheet.

Figure 12B:
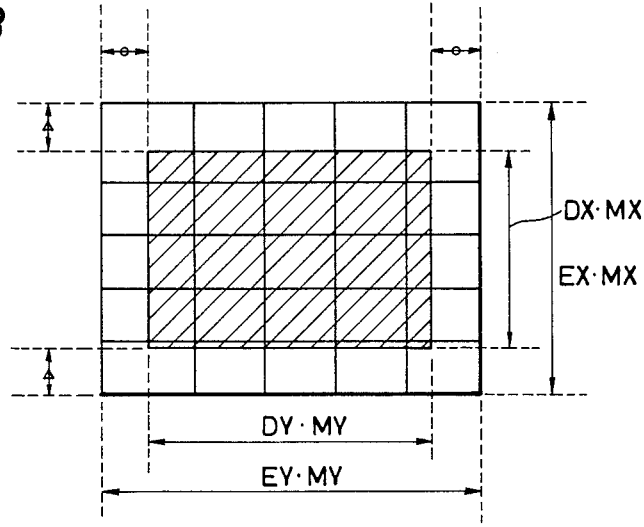

In FIG. 12B, the hatched area indicates said designated area OG after image size variation. In FIG. 12B plural sheets are mutually overlapped by predetermined amounts, as more clearly shown in FIG. 13.

Figure 15A:
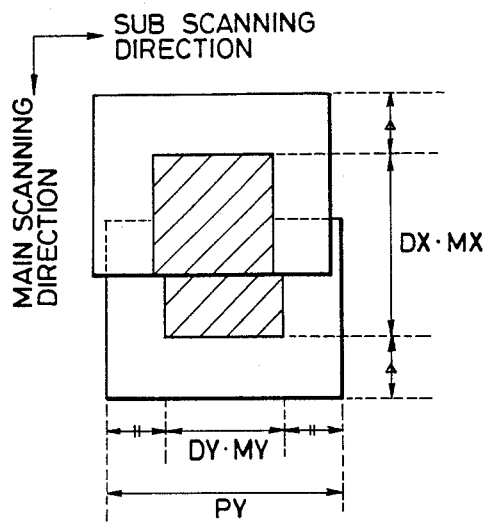

In this mode, if the size $DX\cdot MX$, $DY\cdot MY$, obtained by multiplying the detected or designated image area DX, DY with the image magnification MX, MY, is larger than the sheet size PX, PY available on the printer B, the original image is automatically divided to reproduce the image on plural sheets (NX sheets in the main scanning direction and NY sheets in the sub-scanning direction, or $NX\cdot NY$ sheets in total), thereby providing copies including an output image of a size $DX\cdot MX$, $DY\cdot MY$ as shown in FIG. 12B. The image output is conducted as shown in FIG. 12B if $DX\cdot MX > PX$ and $DY\cdot MY > PY$, but one sheet is enough in the sub-scanning direction if $DX\cdot MX > PX$ and $DY\cdot MY \leq PY$ as shown in FIG. 15A.

Figure 15B:
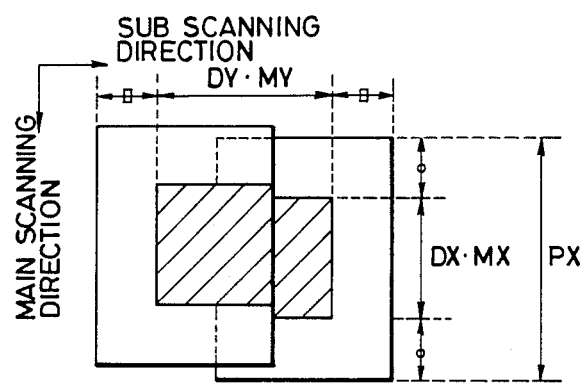

On the other hand, if $DX\cdot MX \leq PX$ and $DY\cdot MY > PY$, one sheet is enough in the main scanning direction as shown in FIG. 15B.

Figure 15C:
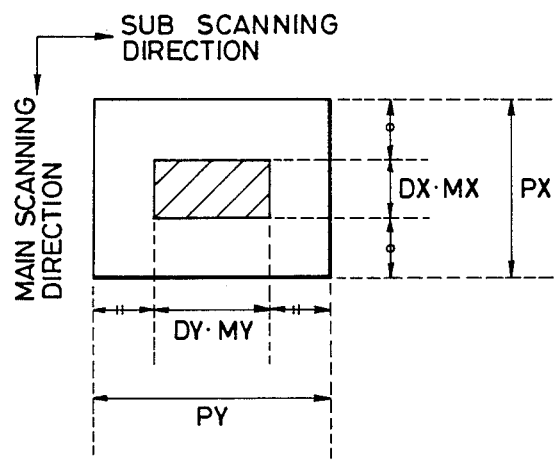

Also in a case where $DX\cdot MX \leq PX$ and $DY\cdot MY \leq PY$, there is required only one sheet in each of the main and sub-scanning directions, or only one sheet in total, as shown in FIG. 15C. In any of these cases, the effective image is automatically centered on one or plural sheets in either scanning direction.

Now reference is made to FIGS. 16A and 16B for explaining the procedure in a divided copying mode.

If the warming up procedure is completed without abnormality after the start of power supply, the liquid crystal display unit 123 shown in FIG. 2 displays a message as shown in (1), indicating that the copying operation is enabled. The actuation of a key SK6, corresponding to the message "MODE", provides a display (2) for setting the copying mode.

In the display (2), a message "NON-EDITING!!" indicates that an editing mode such as image trimming is not selected, and a message "CENTER!!" indicates that a centering mode is selected. In this state the actuation of the key SK6 corresponding to "ETC" allows to select other copying modes. The actuation of the key SK4 or SK5 selects an image movement mode, and the actuation of the key SK1 or SK2 provides a display (3) for selecting the editing modes.

In the display (3), a message "NONE!!" indicates that none of the editing modes is selected, messages with "?" indicate that these modes are selectable. The actuation of the key SK3, corresponding to the message "DIV?", for selecting the divided copying mode provides a display (4).

The display (4) is used for setting the overlapping width or pasting margin for pasting plural recording sheets for either or both of the main (X) and sub (Y) scanning directions.

In the display (4), cursors are blinking corresponding to the directions X and Y, and a number in the unit of millimeters is entered by the numeral keys 103.

For example, the entry of a number "10" followed by the actuation of the asterisk key "*" provides a display (5), indicating the pasting margins for the X- and Y-directions, with a message "OK".

The actuation of the key SK5 corresponding to the message "OK" provides a display (6). Also if a different margin in the Y-direction is desired, the key SK4 is depressed to obtain a display (11).

In the display (11) a cursor blinks corresponding to the margin for the Y-direction. For example the entry of a number "20" followed by the actuation of the asterisk key "*" provides a display (12), and the actuation of the key SK5 corresponding to the message "OK" provides the display (5).

The display (6) is used for selecting whether the division should be made on the entire original or on a partial area thereof. In case of the former, the key SK3 corresponding to the message "WHOLE?" is depressed, whereby the display is changed to (9), indicating the selection of a divided mode for the entire original. On the other hand, if the division is desired for a partial area of the original image, the key SK5 corresponding to the message "PART? " in the display (6) is depressed, whereby the display is changed to (7), which is used for designating the area to be divided, in units of millimeters independently in the main scanning and sub-scanning directions.

A number entered by the numeral keys 103 is displayed at the position of three blinking cursors, and the actuation of the asterisk key moves the three blinking cursors to right. After the entry of four coordinates there is for example obtained a display (8), which is changed to a display (10) by the actuation of the key SK5 corresponding to a message "OK". The display (10) indicates the selection of the divided copying mode for a partial area of the original.

Figure 17A:
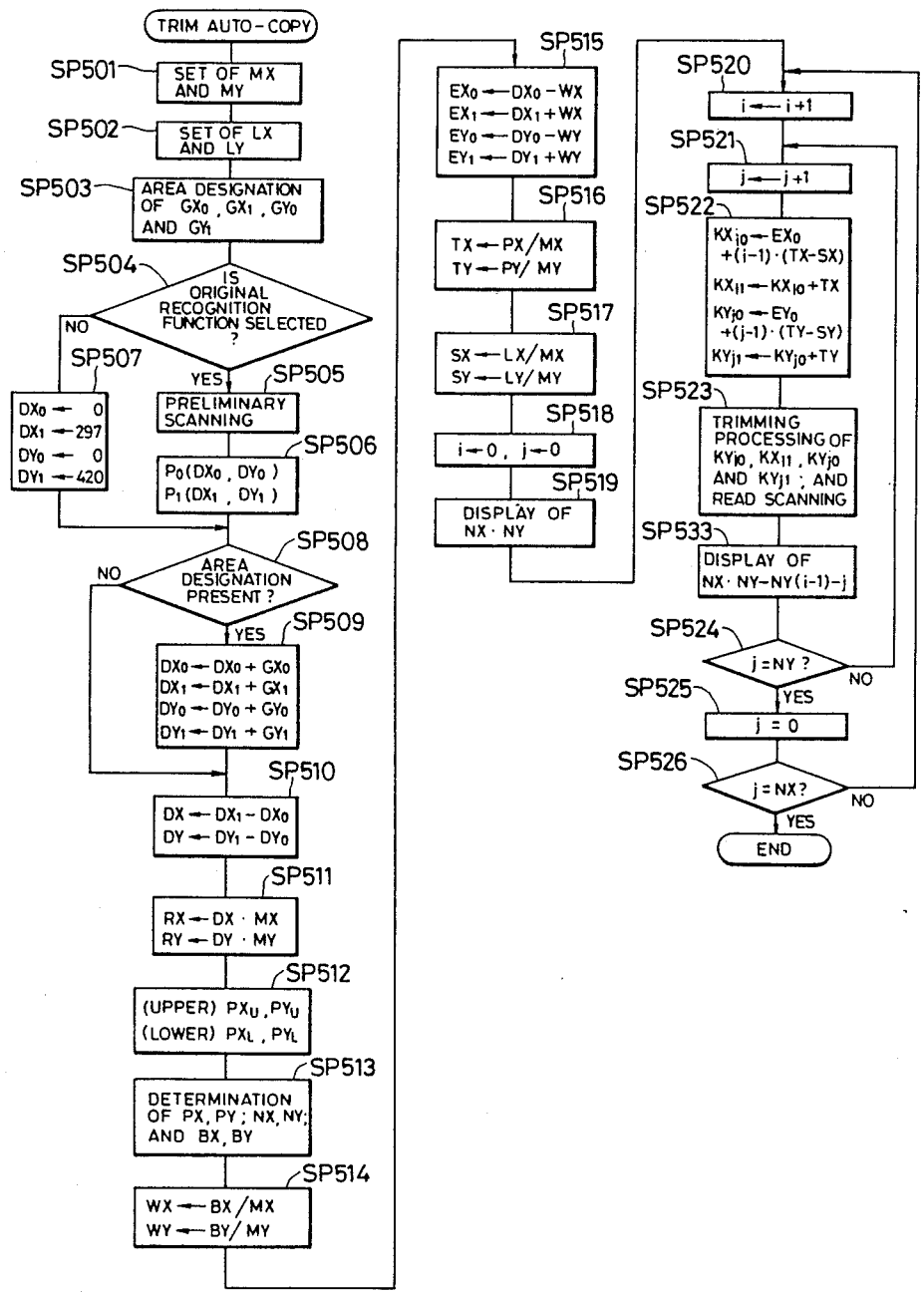
FIGS. 17A, 17B and 20 are flow charts showing the control sequence of the divided copying mode.
Figure 17B:
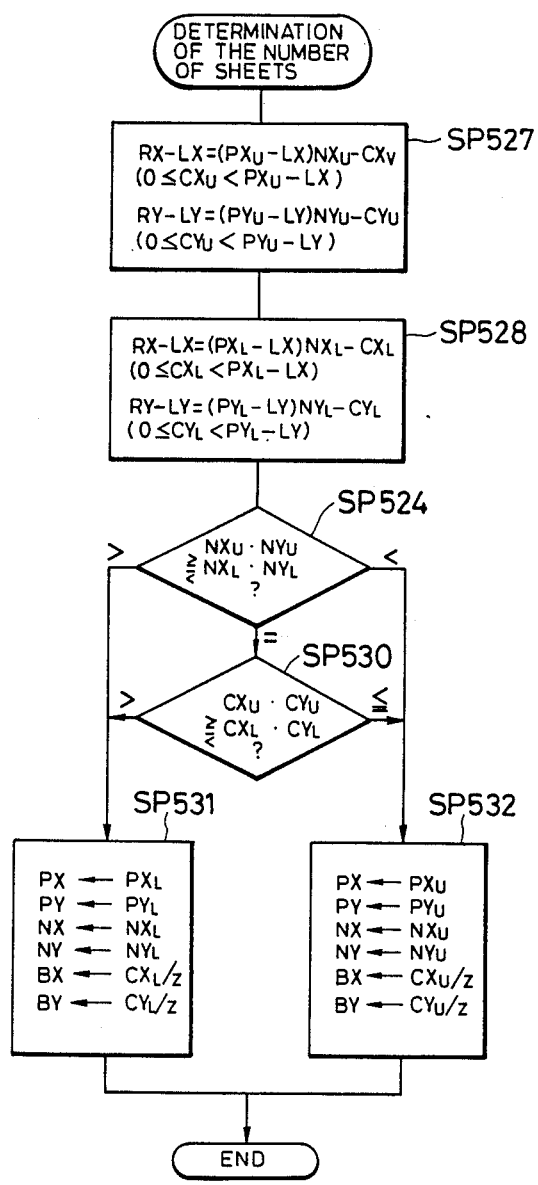

Now reference is made to FIGS. 17A and 17B for explaining the control sequence of the divided copying mode.

At first, when the divided copying mode is selected in the display (3) shown in FIG. 16, there are conducted settings of the image magnifications MX, MY in the main scanning and sub-scanning directions (SP501), pasting margins LX, LY in the main scanning and sub-scanning directions (SP502), and a particular area GX0, GX1, GY0, GY1, if necessary (SP503) according to the instructions from the operation unit. Then, in response to the depression of the start key, if the original sensing function is selected by the key 104 and the display unit 105 shown in FIG. 2 (SP504), there is conducted a pre-scanning for detecting the original (SP505) for detecting the original positions P0 (DX0, DY0) and P1 (DX1, DY1) as shown in FIG. 12A according to the aforementioned principle (SP506). If the original sensing function is not selected (SP504), DX0 and DY0 are set to "0" and DX1 and DY1 are respectively set to "297" and "420" in consideration of the maximum reading area of A3 size of 297×420 mm (SP507). Then, if an area is designated (SP508), the data (GX0, GY0) and (GX1, GY1) of the reading area are corrected according to the position of the original (SP509). Then there are calculated the original size DX, DY (SP510), and the output size RX, RY obtained by multiplying the original size with the selected image magnification (SP511). Then the sheet sizes $PX_u$, $PY_u$ and $PX_L$, $PY_L$ of the sheets contained in the upper and lower cassettes of the printer B are set (SP512). The above-mentioned data are used for calculating the sheet size PX, PY to be employed in a step SP513, required numbers of sheets NX, NY and widths BX, BY of margin to be formed around the output image when the sheets are pasted together, according to a process flow shown in FIG. 17B.

At first the numbers $NX_U$, $NY_U$ of required sheets of the upper cassette are determined independently for the main and sub-scanning directions (SP527), and the numbers $NX_L$, $NY_L$ of the required sheets of the lower cassette are determined likewise (SP528). For example the number $NX_U$ of the sheets of the upper cassette required in the main scanning direction is determined from the conditions $RX-LX=(PXU-LX)\cdot NX_UCXU$ and $0 \leq CXU \leq PXU-LX\cdot CX$ and CY indicates the widths of margin around the image, and suffixes X, Y respectively indicate main scanning and sub-scanning direction, and U and L respectively indicate upper and lower cassettes. The numbers $NY_U$, $NX_L$ and $NY_L$ can be determined in a similar manner.

Then the numbers $NX_U$, $NY_U$ are compared with the numbers $NX_L$, $NY_L$ and a cassette requiring a smaller total number of sheets is selected (SP529).

If the total number of sheets is equal, sheets providing a smaller margin are selected (SP530).

Figure 13:
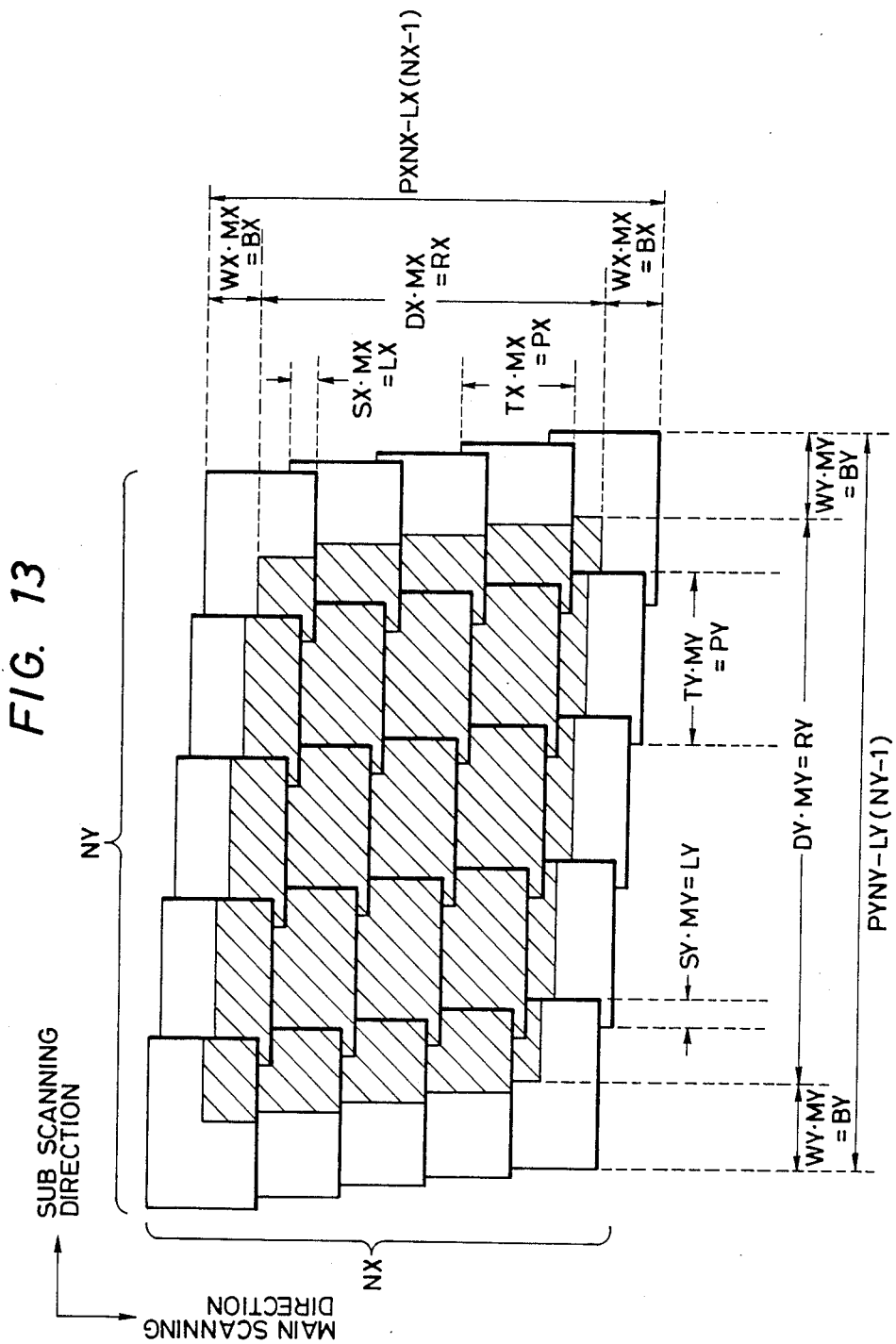

Thus there are set the sheet size PX, PY, required sheet numbers NX, NY and margins BX, BY corresponding to thus selected cassette (SP531, SP532). The margins BX, BY are illustrated in FIG. 13.

Said margins BX, BY of the output image are projected back onto the original image prior to the image size variation to obtain margins WX, WY (SP514).

As shown in FIG. 12A, an actual reading area EX0, EX1, EY0, EY1 is determined by adding said margins WX, WY to the designated reading area (SP515).

Then the trimmed output size TX, TY for a single reading operation is determined from the sheet size PX, PY and the image magnification MX, MY (SP516), and the overlapping widths SX, SY of the trimmed area is determined from the pasting margins LX, LY designated by the operator and the image magnification MX, MY (SP 517).

Figure 14A:
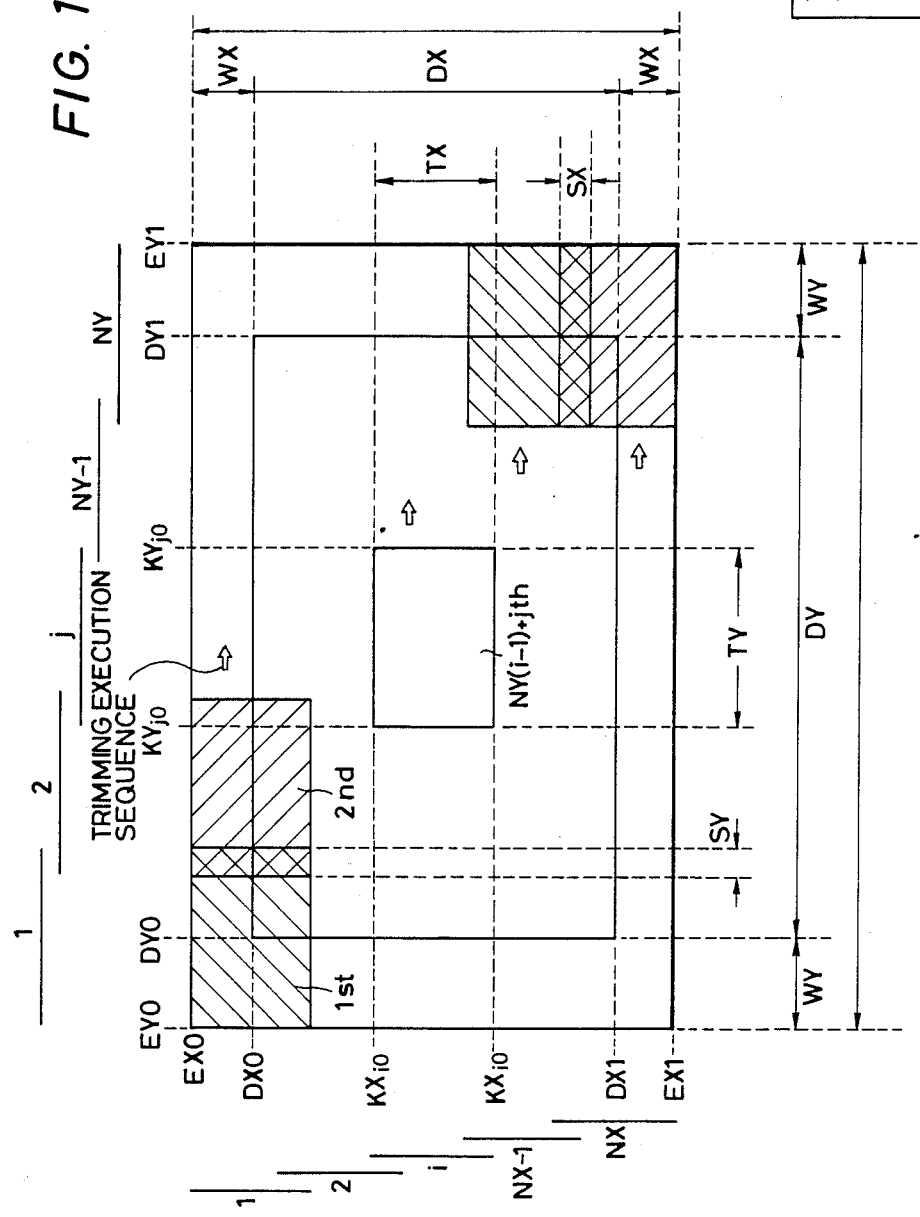
FIGS. 14A, 14B and 21A, 21B are views showing the modes of divided image reading.
Figure 14B:
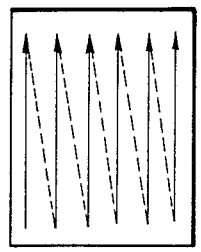

The above-mentioned values TX, TY, SX and SY are illustrated in FIG. 14A. Then a counter for effecting the trimming operations in the order shown in FIG. 14B is secured in an area i, j on the RAM, and an initial value "0" is set therein (SP518).

In the divided copying mode of the present embodiment, the operator is only required to select the image magnification and the pasting margin, and the size and number of sheets required for obtaining an output image of desired size are automatically determined, as explained before, by the CPU 308. Then the number of sheets NX, NY are displayed prior to the start of image reading operation (SP519). Subsequently the counters i, j are respectively increased by one for effecting the trimming operation (SP520, SP521).

In general, as shown in FIG. 14A, the coordinates $KX_{i0}$, $KX_{i1}$, $KY_{j0}$ and $KY_{j1}$ for determining an (im j)−th trimmed area (i−th in the main scanning direction and j−th in the sub-scanning direction) are given by $KX_{i0}=EX_0+(i-1)(TX-SX)$, $KX_{i1}=KX_{i0}+TX$, $KY_{j0}=EY_0+(j-1)(TY-SY)$ and $KY_{j1}=KY_{j0}+TY$. These values are thus calculated and set in a RAM area (SP522).

Then the image reading is conducted and the image of the necessary area is trimmed according to the above-calculated coordinates and copied with an image size variation MX, MY (step 523).

Figure 18:
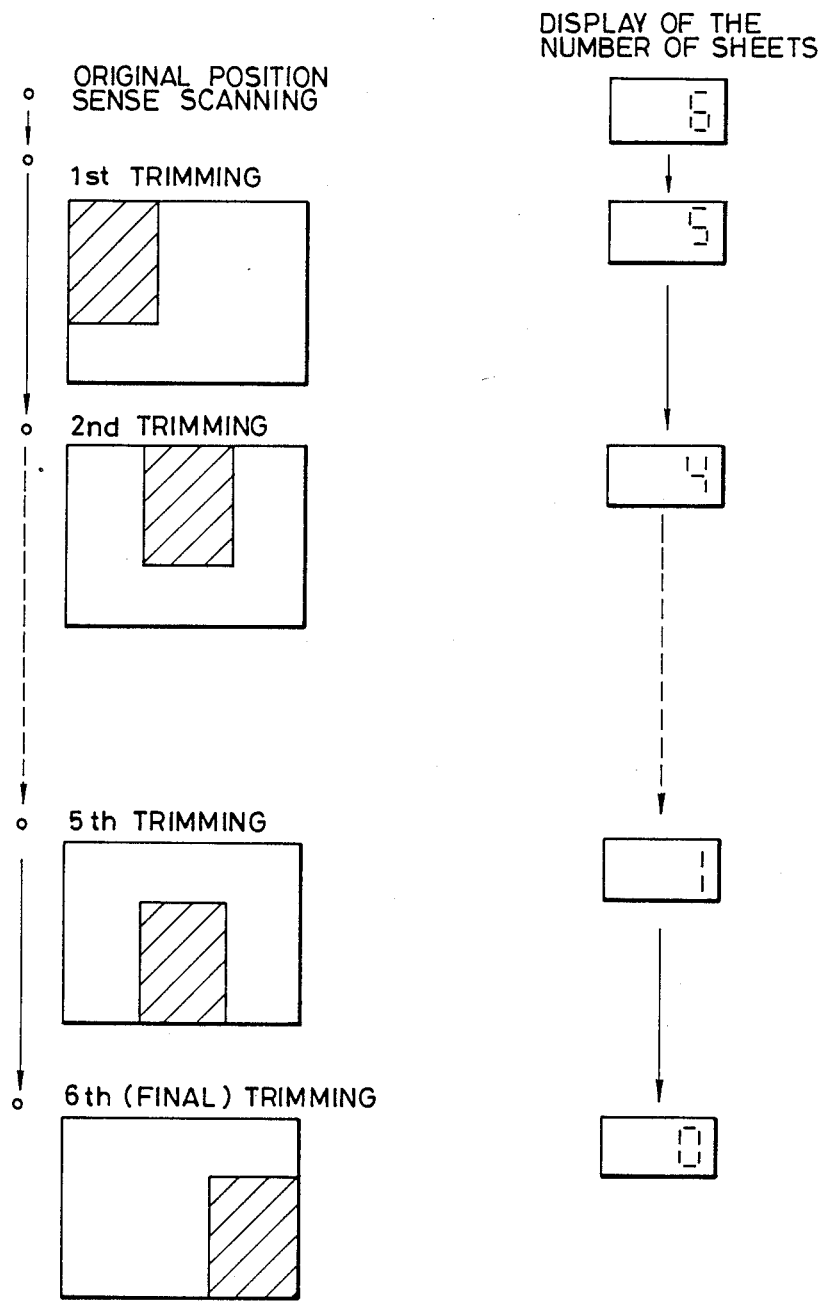
FIG. 18 is a view showing the display mode of a copy number display unit.

Upon completion of the image reading, the display of the copy number is decreased by one to show NY·NY−NY(i−1)−j(SP533). FIG. 18 shows an example of change of the display of copy number, in case MX=2 and NY=3. Thus the operator can know the remaining number of copies. Then there is discriminated whether the trimming operations of NY times have been completed (SP524), and, if not completed, the content of the trimming counter j in the sub-scanning direction is increased by one (SP521) for continuing the trimming operation. On the other hand, if said trimming operations are completed, said counter j is cleared (SP525), and there is discriminated whether the trimming operations of NX times have been completed in the main scanning direction (SP526). If not completed, the trimming counter i in the main scanning direction is increased by one (SP520), and the trimming counter j in the sub-scanning direction, which has been cleared to zero, is also increased by one to continue the trimming operation. On the other hand, if said discrimination turns out complete, indicating the completion of the trimmings of NX·NY times in total and the output of NX·NY copies in total, the copying operation in the present mode is terminated.

In this manner the image of the entire original placed on the support glass as shown in FIG. 12A or of the designated area OG is divided into NX·NY trimmed areas of a size TX, TY with an overlapping margin SX, SY as shown in FIG. 14A and are copied in the illustrated order, whereby NX·NY copies are automatically obtained.

Also the obtained copies can be pasted together with overlapping widths MX·SX, MY·SY as shown in FIG. 13 to obtain an enlarged copy of sizes DX·MX and DY·MY in the main scanning and sub-scanning directions, with a designated pasting margin, which cannot be obtained on a single copy sheet.

In the present embodiment with the maximum sheet of A3 size and the maximum image enlargement of 400 %, the maximum image output is of dimensions of 1188 mm and 1680 mm in the main scanning and sub-scanning directions, corresponding to two A0-sized sheets.

As explained in the foregoing, there is obtained an image reproduction apparatus capable of providing an image, larger than the maximum sheet size available on the printer B, automatically on plural sheets without particular trouble to the operator.

In addition the pasting margin can be arbitrarily selected, and the area division can be applied to an arbitrary area. There are also achieved additional functions such as the image centering in the image area obtained on mutually pasted copy sheets.

In the foregoing embodiment, a reproduced image larger than the single sheet is obtained according to the image magnification selected by the operator.

However, the apparatus will be more convenient for use if the output image size can be entered instead of the image magnification, since the operator often does not know the image magnification but does know the size of the end image.

In the following there will be explained an embodiment emphasizing the performance and operability of the automatic trimming mode for obtaining an image enlarged in excess of the available sheet size, and enabling automatic setting of the sheet size, image magnification and number of divisions, wherein the operator is only required to select the output size larger than A3.

FIG. 19 illustrates the setting procedure of the automatic edit-trimming mode.

The display unit 123 of the operation unit A1 shown in FIG. 2 provides a display (1) if the copying operation is not in progress and if there are no errors in the apparatus, and the actuation of the key SK6 corresponding to the message "MODE" provides a display (2), in which a message "NON-EDITING!!" indicates that the trimming mode is not selected and a message "CENTER!!" indicates that the centering function is selected.

In the display (2), the actuation of the SK6 corresponding to a message "ETC" displays other selected functions. On the other hand, the actuation of the key SK4 or SK5 allows to select other image moving functions, and the actuation of the key SK1 or SK2 provides a display (3).

The display (3) indicates that there can be selected a trimming mode represented by "FRAME", a masking mode represented by "MASKING" or a book mode represented by "BOOK", or such mode can be cancelled by "BACK", and a message "NONE!!" indicates that none of these modes has been selected. The actuation of the key SK1 provides a display (4) allowing the operator to select either an automatic trimming mode for automatic division of the original image or a manual mode in which the operator can arbitrarily designate the trimmed areas.

In the display (4), the actuation of the key SK3 corresponding to the message "AUTO·$\leqq$" selects the automatic trimming mode, whereby provided is a display (5). The displays (5) and (6) allow to select the size of copies obtained as the result of automatic division, wherein the display (5) show A-series sizes while the display (6) show B-series sizes.

In the display (5), the actuation of the key SK5 corresponding the message "ETC" provides the display (6), in which the actuation of the key SK5 corresponding to the message "ETC" provides the display (5). Also in the display (5) or (6), the actuation of the key SK6 corresponding the message "BACK" again provides the display (4). The sizes displayed in (5) or (6) are larger than the maximum sheet size A3 but does not exceed a size equal to the maximum original size A3 times the maximum image magnification of 400 % or the doubled A0 size.

The selection of the automatic trimming mode is completed by the actuation of a key corresponding to a desired size in the display (5) or (6).

The display (7) shows a case in which the key SK1 corresponding to the message "B0" is actuated in the display (6).

Figure 20:
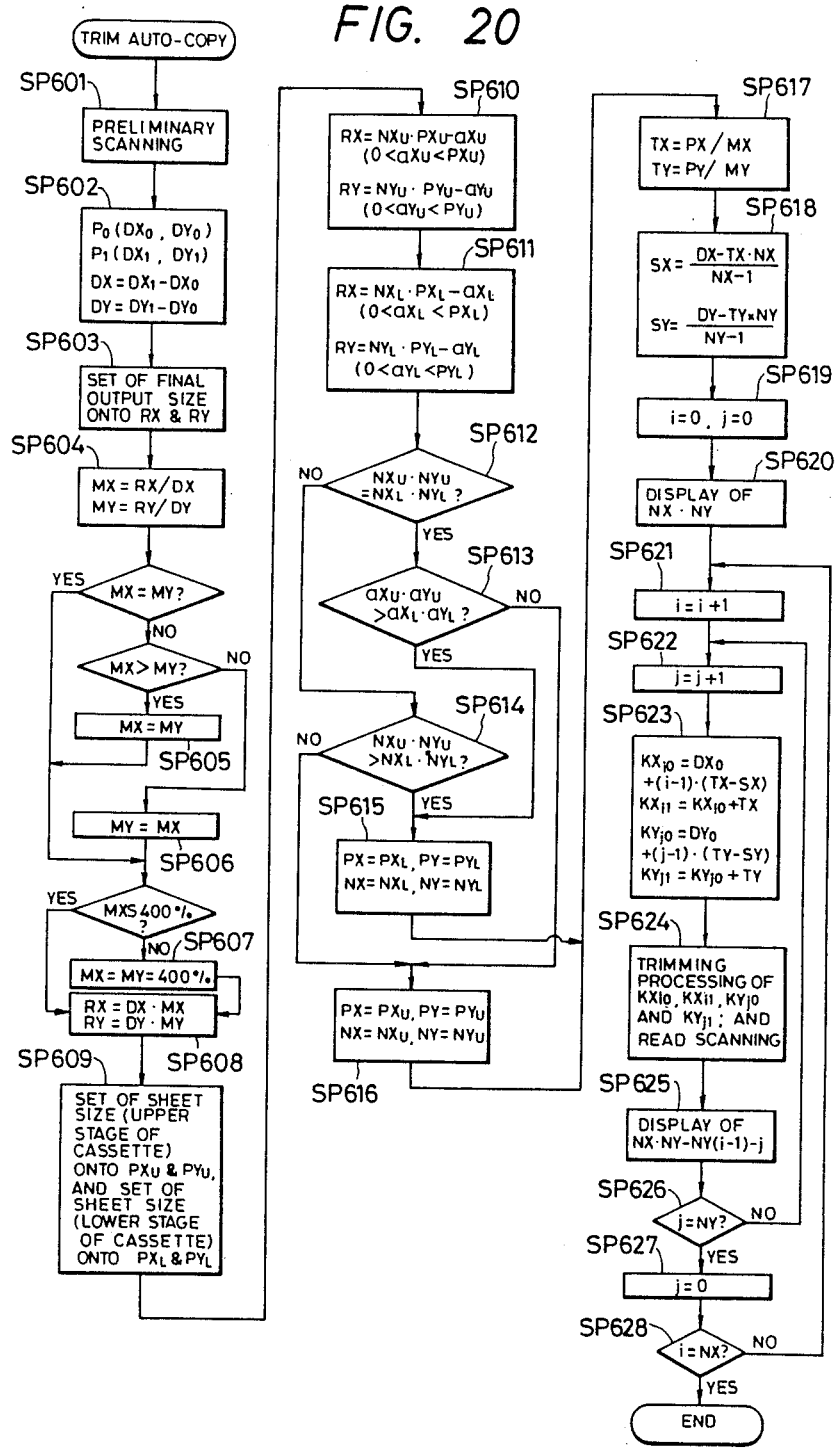
Figure 21A:
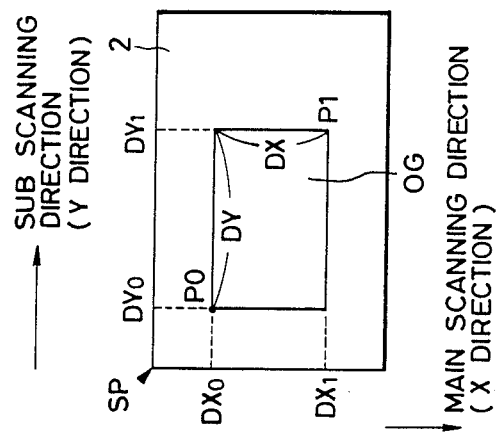

FIG. 20 shows the control sequence of the CPU 308 in the automatic edit/trimming mode. At first there is conducted a pre-scanning operation for sensing the position and size of the original (SP601). According to the principle explained before, the coordinates P0, P1 of the original OG placed on the support glass 2 as shown in FIG. 21(A) are determined and set in the RAM data areas DX0, DX1, DY0, DY1. Also the original sizes DX1−DX0, DY1−DY0 in the X− and Y-directions, determined from said coordinates are respectively set in the RAM data areas DX, DY (SP602).

Subsequently the lengths in the main scanning and sub scanning direction, selected according to the selection shown in FIG. 19 corresponding to the final image size selected by the operator are set in the RAM areas RX, RY (SP603).

Then the image magnifications MX=RX/DX, MY=RY/DY in the main scanning and sub-scanning directions, are determined from the original size DX, DY and the output image size RX, XY (SP604). Then the smaller one of said MX and MY is selected as the common image magnification MX, MY in the main scanning and sub-scanning directions and is set in the RAM data area (SP605, SP606). Since the maximum possible image magnification is 400 %, MX and MY are selected as 400 % in case the result of calculations in the steps SP604, SP605 and SP606 exceeds 400 % (SP607). In such case there is displayed that the image enlargement with the desired magnification is not possible or that the enlargement is conducted at 400 %.

The output image size RX, RY is calculated again from the thus determined image magnification and set on the RAM (SP608).

Then steps SP609 to SP616 select the optimum sheet.

At first the sheet size of the upper cassette is set in RAM data areas PX$_U$, PY$_U$ and that of the lower cassette is set in RAM data areas PX$_L$, PY$_L$ (SP609). Then a value NX satisfying conditions $RX=NX_U PX_U-aX_u$ and $0<aXU<PX_U$ and a value $NY_U$ satisfying conditions $RY=NY_U \cdot PY_U-YU$ and $0<aY_U<PY_U$ are calculated and set in RAM data areas (SP610). This calculation indicates that the output size selected by the operator requires $NX_U$ sheets in the main scanning direction and $NY_U$ sheets in the sub-scanning direction, or $NX_U \cdot NY_U$ sheets in total, when the sheets of the upper cassette are employed.

Also the number of required sheets $NX_L$, $NY_L$ for the lower cassette are likewise determined and set in RAM data areas (SP611).

Then $NX_U \cdot NY_U$ is compared with $NX_L \cdot NY_L$, and a cassette requiring fewer sheets is selected (SP612, SP614, SP615, SP616). If the required number of sheets is equal, a comparison is made between $aX_U \cdot aY_U$ and $aX_L \cdot aY_L$ (SP613)· $aX_i$ or $aY_i$ (i=U, L) indicates the sum of overlapping widths of plural sheets required for obtaining a desired output size, and the step SP613 selects a cassette requiring a smaller overlapping width.

Then the size of the trimmed area is inversely calculated by $TX=PX/MX$ and $TY=PY/MY$ from the automatically selected sheet size PX, PY and the already calculated image magnification MX, MY and is set in RAM data areas TX, TY (SP617). Then a value $SX=(DX-TX \cdot NX)/(NX-1)$ is calculated from the values NX, NY determined in SP615 or SP616, in order to read the original size DX by repeating the reading operation NX times with a trimmed area size TX in the main scanning direction, and the neighboring trimmed areas are mutually overlapped by a length SX. Similarly a value $SY=(DY-TY \cdot NY)/(NY-1)$ is calculated for the sub-scanning direction, and said values SX, SY are set in RAM data areas (SP618).

Figure 21B:
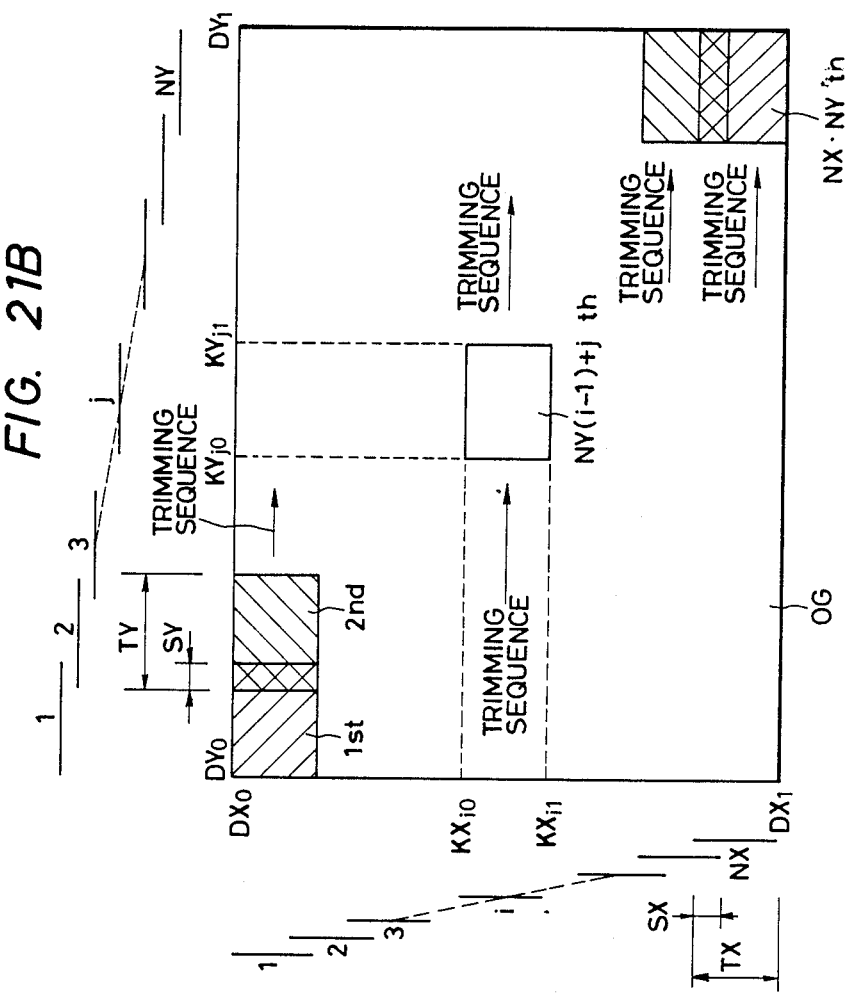
Figure 7A:
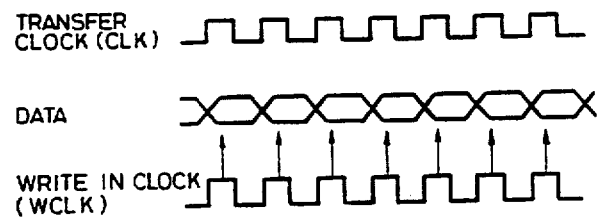
Figure 7B:
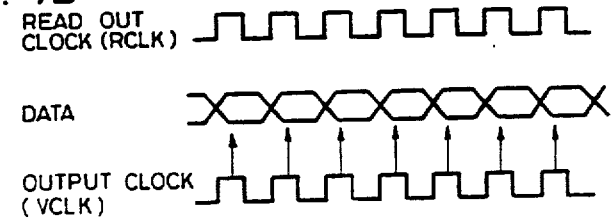
Figure 7C:
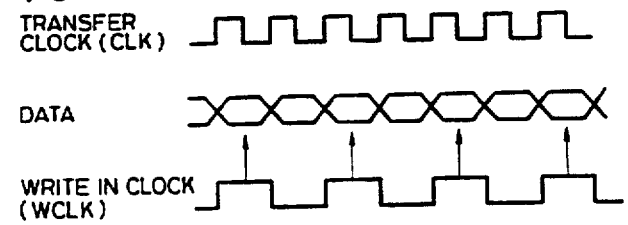
Figure 7D:
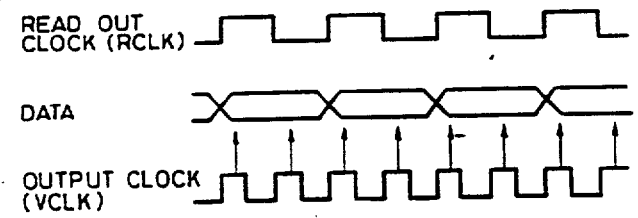
Figure 11:
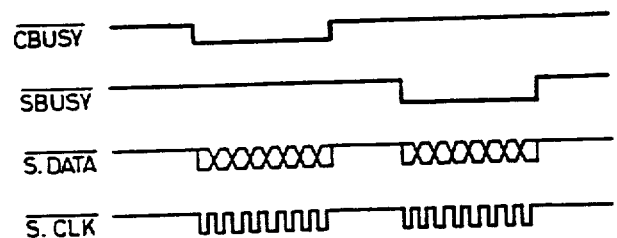
Figure 12A:
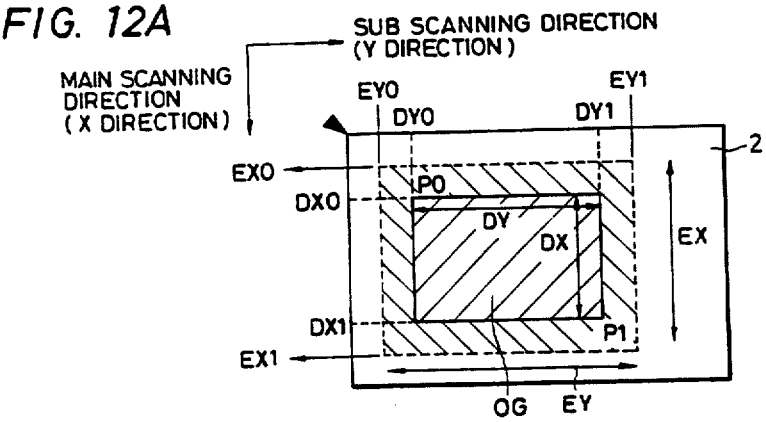
Figure 12B:
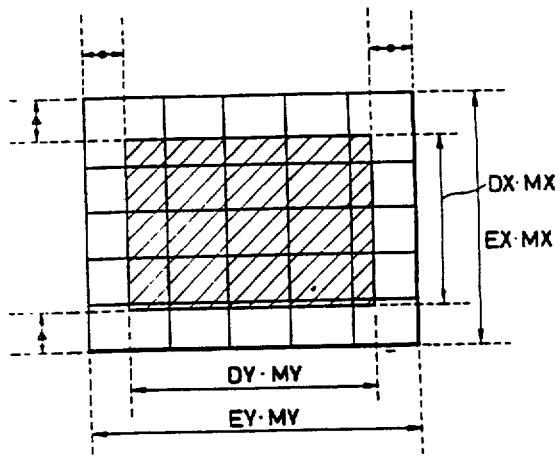

The above-mentioned values NX, NY, TX, TY, SX and SY are illustrated in FIG. 21B. Then, in order to effect the trimmings in the order shown in FIG. 21B, counters are secured in RAM areas i, j and an initial value Q is set therein (SP619).

In this manner the operator is only required to set the final image size, and the number of sheets required for obtaining said size is automatically calculated by the CPU 308. The number of trimmings NX·NY thus determined is displayed on the copy number display unit 111 prior to the start of image reading operation (SP620).

Then, for executing the trimming operation, the contents of the counters i. j are respectively increased by one (SP621, SP622). In general, as shown in FIG. 21(B), coordinates $KX_{i0}$, $KX_{il}$, $KY_{j0}$, $KY_{jl}$ defining an (im j)—th trimmed area (i—th in the main scanning direction and j—th in the sub-scanning direction) are given by $KX_{i0}=DX0+(i-1)(TX-SX)$, $KX_{il}=KX_{i0} TX$, $KY_{j0}=DY_0+(j-1)(TY-SY)$, and $KY_{jl}=KY_{i0}+TY$ as will be apparent from FIG. 14A. These values are thus calculated and set in RAM areas (SP623).

Then image reading is conducted, and a required area alone is trimmed by the shift memory unit 303, based on the above-mentioned trimming coordinates and is reproduced after image size variation with a magnification MX, MY (SP624).

Upon completion of the image reading, the display of the copy number display unit 111 is decreased by one to display a number $NX \cdot NY-NY(i-1)-j$ (SP625).

Then there is discriminated whether a total of NY trimming operations have been completed in the sub-scanning direction (SP626), and, if not completed, the content of the sub-scanning trimming counter j is increased by one (SP622) to continue the trimming operation. On the other hand, if the trimming operations have been completed, said counter j is cleared to zero (SP627), and there is discriminated whether NX trimming operations in the main scan direction have been completed (SP628). If not, the main scanning trimming counter i is increased by one (SP621), and the counter j, which is already cleared to zero, is increased by one to continue the trimming operation. On the other hand, if said discrimination turns out complete, indicating the completion of NX·NY trimming operations and formation of NX·NY copies, the copying operation in the present mode is terminated.

In this manner the original OG placed on the support glass 2 as shown in FIG. 21A is automatically divided into NX·NY areas of a size TX, TY each with an overlapping width SX, SY in the order illustrated in FIG. 21B to obtain NX·NY copies in total.

Also, the obtained copies can be pasted together with overlapping widths MX·SX, MY·SY as shown in FIG. 22 to obtain an enlarged copy of sizes $RX=DX \cdot MX$ and $RY=DY \cdot MY$ in the main scanning and sub-scanning directions, which cannot be obtained on a single copy sheet.

In the present embodiment with the maximum sheet of A3 size and the maximum image enlargement of 400 %, the maximum image output is of dimensions of 1188 mm and 1680 mm in the main scanning and sub-scanning directions, corresponding to two A0-sized sheets.

In the foregoing explanation the maximum readable original size and the maximum recording sheet size are both selected as A3, but the present invention is not limited to such case and is applicable to originals and recording sheets of various sizes.

Also, the detection of the original size need not be conducted by the image reading sensor but can be executed by an exclusive size detecting sensor.

As detailedly explained in the foregoing, there is provided an image reproduction apparatus capable of automatically reproducing an image of a size exceeding the size of the available recording sheet, without any burden to the operator.

The present invention is not limited to the foregoing preferred embodiments but is subject to various modifications and variations within the scope and spirit of the appended claims.

What is claimed is:

1. An image reproduction apparatus comprising:
   output means for outputting image data representing an original image;
   designation means for designating an arbitrary area of the original image; and
   reproduction means for reproducing an image on the basis of the image data, said reproduction means being operable to divide the image of the area designated by said designation means into plural areas and reproducing images of the plural areas on different recording materials, respectively.

2. An image reproduction apparatus according to claim 1, wherein said reproduction means is operable to reproduce each of the divided images, after enlargement, on the recording material.

3. An image reproduction apparatus according to claim 1, wherein said reproduction means is operable to reproduce the image of the designated area in the center of an image frame constituted by plural recording materials.

4. An image reproduction apparatus according to claim 1, wherein said reproduction means is operable to determine a number of divisions of the image according to a size of the recording material.

5. An image reproduction apparatus according to claim 1, wherein said output means comprises scanning means for scanning the original image.

6. An image reproduction apparatus comprising:
output means for outputting image data representing an original image;
selection means for selecting a size of a recording material; and
reproduction means for reproducing an image on the basis of the image data, said reproduction means being operable to divide the original image into plural areas and reproducing images of the plural areas respectively on different recording materials of the size selected by said selection means;
wherein said selection means is operable to select the size of the recording material so as to reduce a number of divisions of the original image.

7. An image reproduction apparatus according to claim 6, wherein said reproduction means is operable to reproduce each of, after enlargement, on the recording material.

8. An image reproduction apparatus according to claim 6, wherein said output means comprises scanning means for scanning the original image.

9. An image reproduction apparatus comprising:
output means for outputting image data representing an original image;
setting means for setting a desired reproduced image size; and
reproduction means for reproducing an image on a basis of the image data, said reproduction means being operable to determine a number of divisions of the original image and an image magnification according to the desired reproduced image size set by said setting means divide the original image into a number of divisional images equal to the number of divisions thus determined, vary the size of the image which has been thus divided with the image magnification thus determined and reproduce said divisional images on different recording materials, respectively.

10. An image reproduction apparatus according to claim 9, wherein said reproduction means is operable to determine the size of the recording material in accordance with the reproduced image size thus set.

11. An image reproduction apparatus according to claim 9, wherein said reproduction means varies the image size with a predetermined image magnification in case the image magnification determined according to the reproduced image size is outside the range of realizable image magnifications.

12. An image reproduction apparatus according to claim 9, wherein said output means comprises scanning means for scanning the original image.

13. An image reproduction apparatus comprising:
output means for outputting image data representing an original image;
reproduction means for reproducing an image on the basis of the image data, said reproduction means being operable to divide the original image into plural areas and thus divided reproduce images of the plural areas respectively on different recording materials with mutual overlapping; and
setting means for arbitrarily setting an amount of said overlapping.

14. An image reproduction apparatus according to claim 13, wherein said reproduction means is operable to reproduce thus divided images, after enlargement, on the recording materials.

15. An image reproduction apparatus according to claim 13, wherein said reproduction means is operable to determine a number of divisions of the image in accordance with a size of the recording material.

16. An image reproduction apparatus according to claim 13, wherein said output means comprises scanning means for scanning the original image.

17. An image reproduction apparatus according to claim 13, wherein said reproduction means is operable to vary the amount of said overlapping in accordance with a size of the produced image.

18. An image reproduction apparatus comprising:
scanning means for scanning an original image;
designation means for designating an arbitrary area of the original image; and
reproduction means for reproducing the original image scanned by said scanning means, said reproduction means being operable to divide the image of the area designated by said designation means into plural areas and reproduce images of thus divided ares on different recording materials, respectively.

19. An image reproduction apparatus according to claim 18, wherein said reproduction means is operable to reproduce each of the images of the plural areas, after enlargement, on the recording material.

20. An image reproduction apparatus according to claim 18, wherein said reproduction means is operable to reproduce an image of the designated area in the center of an image frame constituted by plural recording material.

21. An image reproduction apparatus according to claim 18, wherein said reproduction means is operable to determined a number of divisions of the original image according to a size of the recording material.

22. An image reproduction apparatus comprising:
scanning means for scanning an original image;
selection means for selecting a size of a recording material; and
reproduction means for reproducing the original image scanned by said scanning means, said scanning means being operable to divide the original image into plural areas and to reproduce images of the plural areas respectively on different recording materials of thus selected size,
wherein said selection means is operable to select the size of the recording material so as to reduce a number of divisions of the original image.

23. An image reproduction apparatus according to claim 22, wherein said reproduction means is operable to reproduce each of the plural area images, after enlargement, on the recording material.

24. An image reproduction apparatus comprising:
scanning means for scanning an original image;
setting means for setting a desired reproduced image size; and
reproduction means for reproducing the original image scanned by said scanning means, said scanning means being operable to determined a number of divisions of the original image and an image magnification according to the desired reproduced image size st by said setting means, divide the original image into a number of divisional images, equal in number to the number of divisions thus determined, vary the size of the original image with the image magnification thus determined and reproduce the divisional images on different recording materials, respectively.

25. An image reproduction apparatus according to claim 24, wherein said reproduction means is operable to determined the size of the recording material in accordance with the desired reproduced image size set by said setting means.

26. An image reproduction apparatus according to claim 24, wherein said reproduction means varies the size with a predetermined image magnification in a case in which the image magnification determined according to the desired reproduced image size is outside a range of realizable image magnifications.

27. An image reproduction apparatus comprising:
scanning means for scanning an original image;
reproduction means for reproducing the original image scanned by said scanning means, said scanning means being operable to divide the original image into plural areas and reproduce images of the plural areas respectively on different recording materials with mutual overlapping; and
setting means for arbitrarily setting an amount of said overlapping.

28. An image reproduction apparatus according to claim 27, wherein said reproduction means is operable to reproduce the images of the plural bares, after enlargement, on the recording materials.

29. An image reproduction apparatus according to claim 27, wherein said reproduction means is operable to determine a number of divisions of the original image in accordance with a size of the recording material.

30. An image reproduction apparatus according to claim 27, wherein said reproduction means is operable to vary the amount of said overlapping in accordance with a size of the reproduced image.

* * * * *

UNITED STATES PATENT AND TRADEMARK OFFICE
CERTIFICATE OF CORRECTION

Page 1 of 7

PATENT NO. : 4,947,269
DATED : August 7, 1990
INVENTOR(S) : MASANORI YAMADA

It is certified that error appears in the above-indentified patent and that said Letters Patent is hereby corrected as shown below:

TITLE PAGE

IN [56] REFERENCES CITED

U.S. PATENT DOCUMENTS, "Yagischi" should read --Yaguchi-- and "Yaguchz" should read --Yaguchi--.

IN "PRIMARY EXAMINER"

"Jr." should read --Sr.--.

IN THE DRAWINGS

Sheet 7 and 11 of the drawings, consisting of Figs 7-12 should be inserted as part of Letter Patent as shown on the attached sheets.

COLUMN 1

Line 6, "continuation-in-part" should be deleted.
Line 14, "tion for" should read --tion apparatus for--.
Line 17, "machine" should read --machines--.
Line 25, ""pasting" should read --"pasting"--.
Line 26, "claims, is" should read --claims as--.
Line 32, "the" should be deleted.
Line 45, "addition" should read --addition,--.
Line 49, "more" should read --more,--.

COLUMN 2

Line 25, "unit; unit;" should read --unit;--.
Line 34, "FIG. 7" should read --FIG. 7,--.

COLUMN 4

Line 28, "sub scanning" should read --sub-scanning--.

UNITED STATES PATENT AND TRADEMARK OFFICE
CERTIFICATE OF CORRECTION

PATENT NO. : 4,947,269

DATED : August 7, 1990

INVENTOR(S) : MASANORI YAMADA

It is certified that error appears in the above-identified patent and that said Letters Patent is hereby corrected as shown below:

COLUMN 5

Line 42, "horizontal synchronization signal SHYNC" should read --horizontal synchronization signal HSYNC--.
    Line 44, "sub scanning" should read --sub-scanning--.
    Line 66, "sub scanning counter 452" should read --sub-scanning counter 452--.

COLUMN 6

Line 10, "sub scanning" should read --sub-scanning--.
    Line 26, "SHYNC signal." should read --HSYNC signal.--.
    Line 47, "sub scanning counter 452" should read --sub-scanning counter 452--.
    Line 62, "sub scanning" should read --sub-scanning--.

COLUMN 7

Line 19, "OR gates" should read --OR gates--.
    Line 27, "released" should read --releases--.
    Line 31, "OR" should read --OR--.
    Line 61, "sub scanning" should read --sub-scanning--.

COLUMN 9

Line 1, "flip-flop 14," should read --flip-flop 914,--.
    Line 17, "pseud" should read --pseudo- --.

UNITED STATES PATENT AND TRADEMARK OFFICE
CERTIFICATE OF CORRECTION

PATENT NO. : 4,947,269

DATED : August 7, 1990

INVENTOR(S) : MASANORI YAMADA

It is certified that error appears in the above-identified patent and that said Letters Patent is hereby corrected as shown below:

COLUMN 11

Line 62, "RX-LX=(PXU-LX)·$NX_U$CXU" should read --RX-LX=($PX_U$-LX)·$NX_U$-$CX_U$--.

Line 63, "O≦CXU≦PXU-LX·CX and CY indicates" should read --O≦$CX_U$≦$PX_U$-LX.  CX and CY indicate--.

Line 66, "direction," should read --directions,--.

COLUMN 12

Line 42, "$KX_{io}$ TX," should read --$KX_{io}$+TX,--.

COLUMN 13

Line 29, "addition" should read --addition,--.

Line 59, "the SK6" should read --the key SK6--.

COLUMN 14

Line 9, "message "AUTO·≦" should read --message "AUTO?"--.

Line 13, "show" should read --shows--.

Line 14, "show" should read --shows--.

Line 22, "does not" should read --do not--.

Line 44, "sub scanning direction," should read --sub-scanning directions,--.

UNITED STATES PATENT AND TRADEMARK OFFICE
CERTIFICATE OF CORRECTION

PATENT NO. : 4,947,269

DATED : August 7, 1990

INVENTOR(S) : MASANORI YAMADA

Page 4 of 7

It is certified that error appears in the above-identified patent and that said Letters Patent is hereby corrected as shown below:

COLUMN 15

Line 1, "value NX" should read --value $NX_u$-- and "$RX=NX_u PXU-aX_u$" should read --$RX=NX_u \cdot PX_u - aX_u$--.

Line 2, "$O<aXU<PX_u$" should read --$O<aX_u<PX_u$--.

Line 3, "$RY=NY_u \cdot PY_u - YU$" should read --$RY=NY_u \cdot PY_u - Y_u$--.

Line 17, "(SP613).$aX_i$" should read --(SP613). $aX_i$--.

Line 52, "$KX_{i0}=DX0 +(i-1)(TX-SX)$, $KX_{i1}=KX_{i0} TX$," should read --$KX_{i0}=DX_0+(i-1)(TX-SX)$, $KX_{i1}=KX_{i0}+TX$,--.

COLUMN 16

Line 4, "scan" should read --scanning--.

COLUMN 17

Line 22, "of, after" should read --of the divided images, after--.

Line 37, "means divide" should read --means, divide--.

COLUMN 18

Line 15, "produced image." should read --reproduced image.--.

Line 25, "ares" should read --areas--.

Line 35, "material." should read --materials.--.

Line 38, "determined" should read --determine--.

Line 63, "determined" should read --determine--.

Line 66, "st" should read --set--.

UNITED STATES PATENT AND TRADEMARK OFFICE
CERTIFICATE OF CORRECTION

PATENT NO. : 4,947,269
DATED : August 7, 1990
INVENTOR(S) : MASANORI YAMADA

It is certified that error appears in the above-identified patent and that said Letters Patent is hereby corrected as shown below:

COLUMN 19

Line 7, "determined" should read --determine--.

COLUMN 20

Line 9, "plural bares," should read --plural areas,--.

Signed and Sealed this

Twenty-seventh Day of December, 1994

Attest:

BRUCE LEHMAN

Attesting Officer

Commissioner of Patents and Trademarks